(12) United States Patent
Tomoda

(10) Patent No.: US 12,438,982 B2
(45) Date of Patent: *Oct. 7, 2025

(54) CALL SUBJECT DETERMINATION SYSTEM, CALL SUBJECT DETERMINATION METHOD, AND INFORMATION STORAGE MEDIUM

(71) Applicant: RAKUTEN GROUP, INC., Tokyo (JP)

(72) Inventor: Kyosuke Tomoda, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 348 days.

This patent is subject to a terminal disclaimer.

(21) Appl. No.: 18/137,443

(22) Filed: Apr. 21, 2023

(65) Prior Publication Data

US 2023/0344938 A1    Oct. 26, 2023

(30) Foreign Application Priority Data

Apr. 22, 2022   (JP) ................. 2022-070959

(51) Int. Cl.
*H04M 3/00* (2024.01)
*H04M 3/432* (2006.01)
*H04M 3/51* (2006.01)

(52) U.S. Cl.
CPC ......... *H04M 3/5183* (2013.01); *H04M 3/432* (2013.01); *H04M 2203/2072* (2013.01); *H04M 2203/556* (2013.01)

(58) Field of Classification Search
CPC ............... H04M 3/5183; H04M 3/432; H04M 2203/2072; H04M 2203/556

USPC ....... 379/265.01–265.14, 266.01–266.1, 309
See application file for complete search history.

(56) References Cited

U.S. PATENT DOCUMENTS

| | | | |
|---|---|---|---|
| 9,558,466 B2* | 1/2017 | Ryali | G06Q 10/0639 |
| 10,708,428 B2* | 7/2020 | Mezhibovsky | H04M 3/5237 |
| 10,917,521 B1* | 2/2021 | Koster | H04M 1/72454 |
| 2009/0161849 A1* | 6/2009 | Minnich, Jr. | H04M 3/5175 |
| | | | 379/112.01 |
| 2016/0057284 A1* | 2/2016 | Nagpal | H04M 3/5232 |
| | | | 379/266.07 |
| 2021/0241235 A1* | 8/2021 | Kosai | G06N 20/20 |

(Continued)

FOREIGN PATENT DOCUMENTS

| | | |
|---|---|---|
| JP | 2018-081725 A | 5/2018 |
| JP | 2018-093273 A | 6/2018 |
| JP | 2018-169738 A | 11/2018 |

*Primary Examiner* — William J Deane, Jr.
(74) *Attorney, Agent, or Firm* — HEA Law PLLC

(57) ABSTRACT

Provided is a call subject determination system including at least one processor configured to: predict, for each of a plurality of call candidates, a talk probability, which is a probability of succeeding in holding a phone talk with the call candidate; predict, for each of the plurality of call candidates, an advantageous result to be gained from the phone talk with the call candidate; acquire a talker constraint, which is a constraint in terms of capacity of a talker; and determine, from among the plurality of call candidates, a plurality of call subjects to whom phone calls are to be made so that the talker constraint is satisfied and great advantageous results are gained from the plurality of call subjects on the whole, based on the talk probability and the advantageous result of the each of the plurality of call candidates.

16 Claims, 11 Drawing Sheets

(56) References Cited

U.S. PATENT DOCUMENTS

2022/0094792 A1\* 3/2022 Moller ................. H04L 67/306
2023/0308545 A1\* 9/2023 DiMaria ............. H04L 65/1096

\* cited by examiner

FIG.2
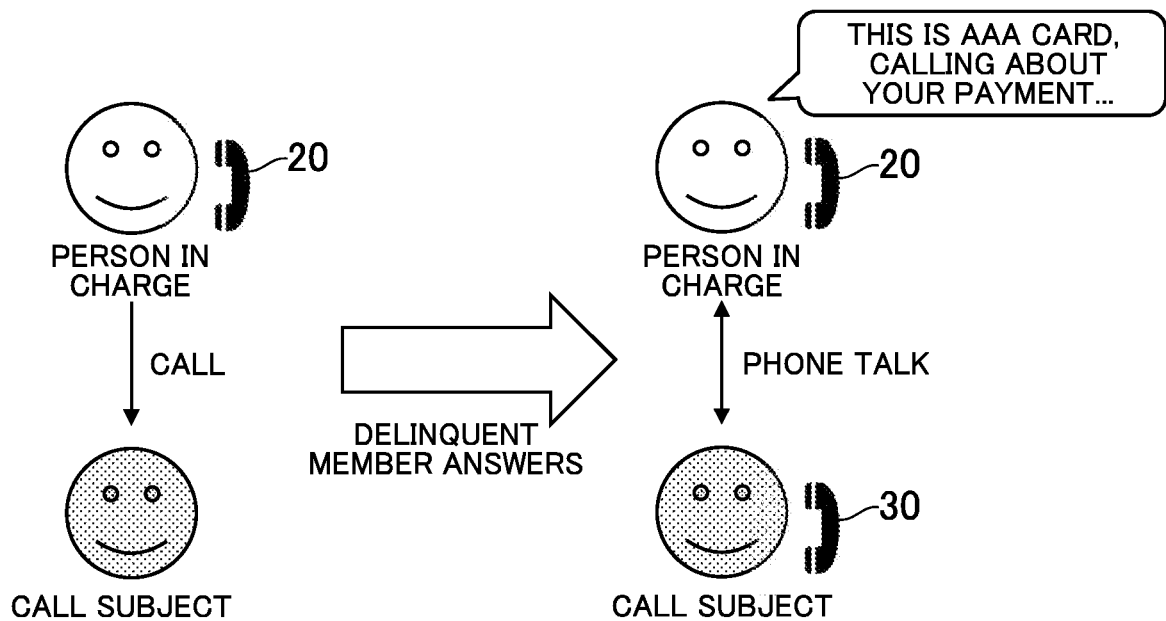
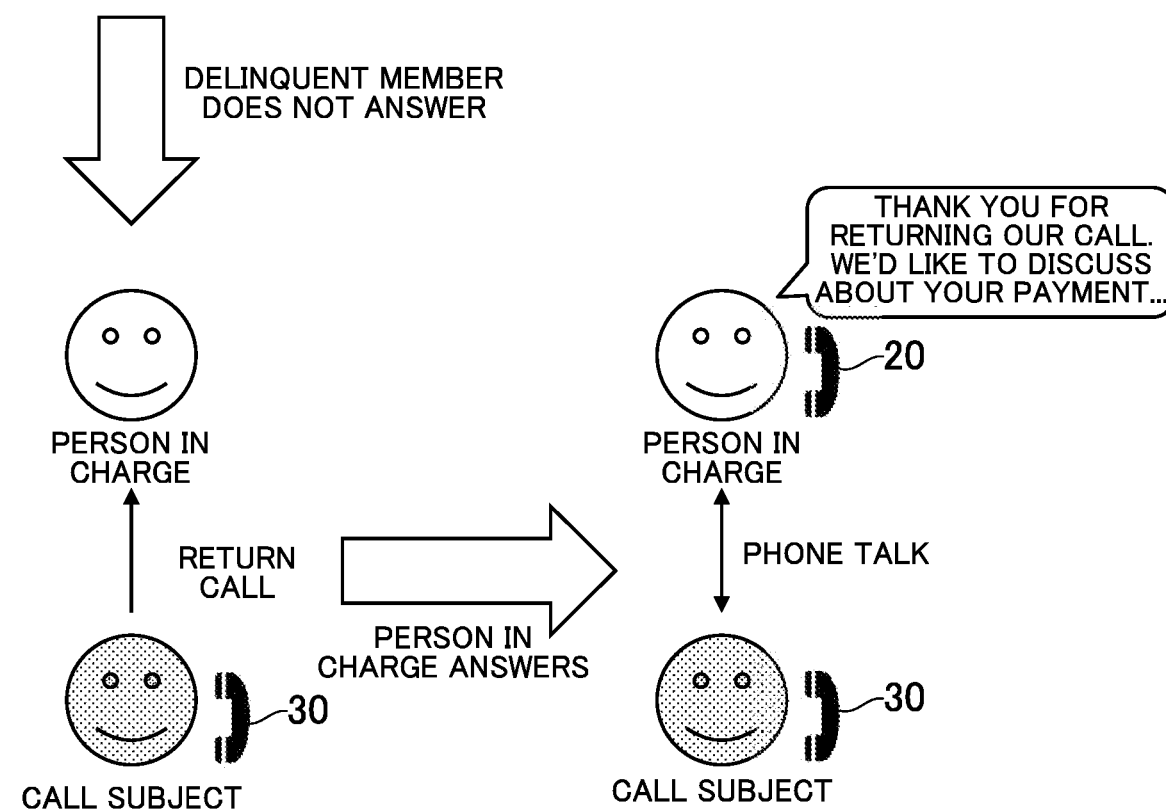

FIG.3
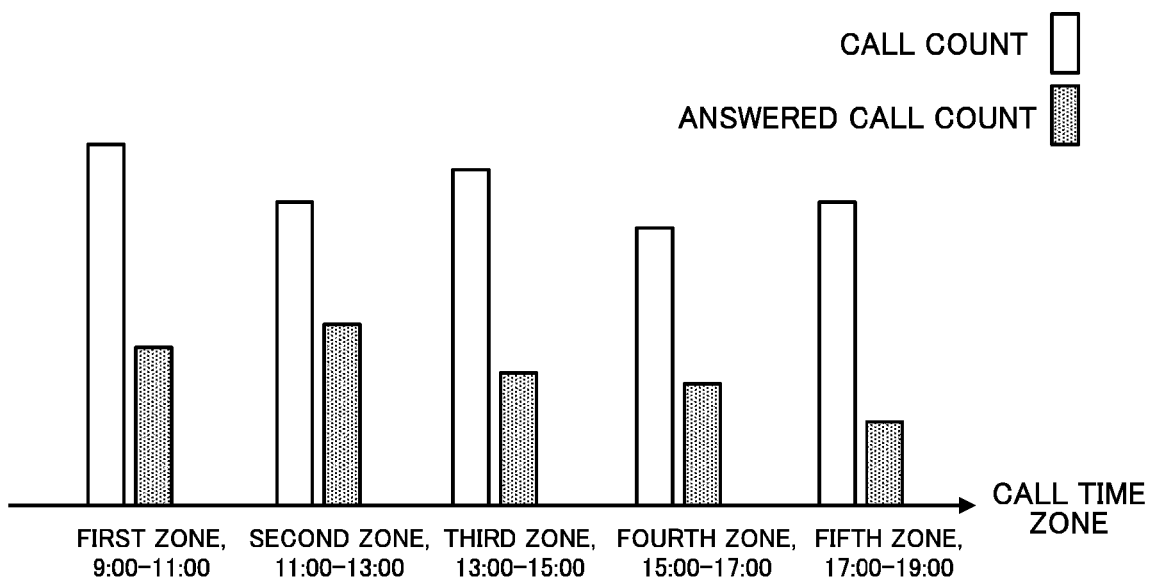
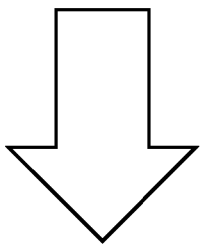
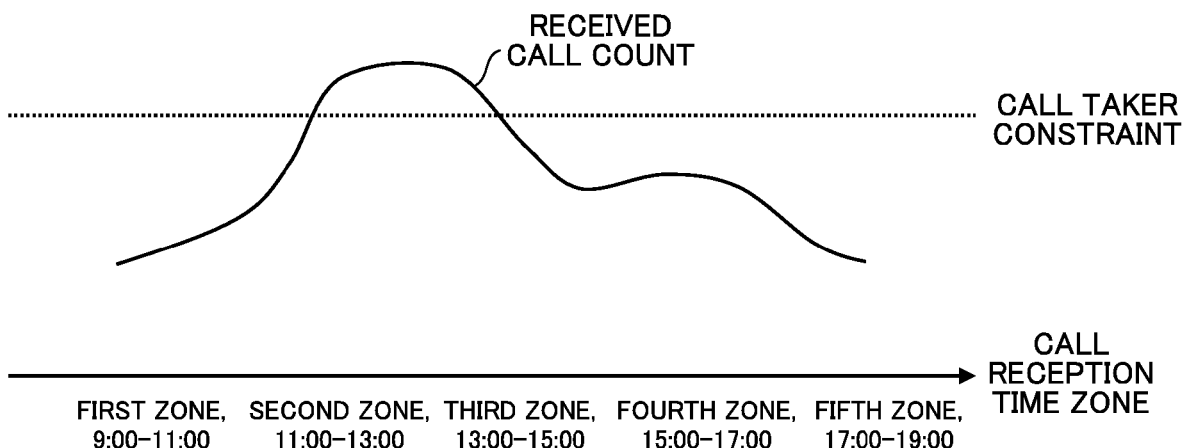

FIG.5

| CARD NUMBER | NAME | PHONE NUMBER | OCCUPATION | PAYMENT INFORMATION | CALL SUBJECT INFORMATION | DEALINGS HISTORY INFORMATION |
|---|---|---|---|---|---|---|
| 5789342329084310 | TARO YAMADA | 090-AAAA-AAAA | COMPANY WORKER | 90,000 YEN | 2022/4/1 FIRST ZONE,THIRD ZONE | - |
| 8398430394124810 | HANAKO ITO | 03-BBBB-BBBB | STUDENT | 12,000 YEN | 2022/4/1 FIRST ZONE,SECOND ZONE,FIFTH ZONE | - |
| 3989893243979520 | TAKASHI TACHIBANA | 080-CCCC-CCCC | PUBLIC SERVICE WORKER | 50,000 YEN | 2022/4/1 SECOND ZONE,FOURTH ZONE | - |
| : | : | : | : | : | : | : |

| CARD NUMBER | ADVANTAGEOUS RESULT | PREDICTION RESULT OF PREDICTION MODEL FOR FIRST ZONE | | | | | | PREDICTION RESULT OF PREDICTION MODEL FOR SECOND ZONE | | | | | |
|---|---|---|---|---|---|---|---|---|---|---|---|---|---|
| | | ANSWERING PROBABILITY | RETURN CALL PROBABILITY FOR FIRST ZONE | RETURN CALL PROBABILITY FOR SECOND ZONE | RETURN CALL PROBABILITY FOR THIRD ZONE | RETURN CALL PROBABILITY FOR FOURTH ZONE | RETURN CALL PROBABILITY FOR FIFTH ZONE | NO-RETURN -CALL PROBABILITY | ANSWERING PROBABILITY | RETURN CALL PROBABILITY FOR SECOND ZONE | RETURN CALL PROBABILITY FOR THIRD ZONE | RETURN CALL PROBABILITY FOR FOURTH ZONE | NO-RETURN -CALL PROBABILITY |
| 5789342329084310 | 75000円 | 20% | 30% | 25% | 15% | 5% | 2% | 3% | 20% | 25% | 20% | 10% | 15% |
| 8398430394124810 | 12000円 | 30% | 20% | 15% | 20% | 10% | 3% | 2% | 25% | 20% | 15% | 5% | 20% |
| 3989893243979520 | 20000円 | 10% | 15% | 20% | 15% | 20% | 10% | 10% | 25% | 15% | 20% | 5% | 20% |
| ... | ... | ... | ... | ... | ... | ... | ... | ... | ... | ... | ... | ... | ... |

| PREDICTION RESULT OF PREDICTION MODEL FOR THIRD ZONE | | | | | PREDICTION RESULT OF PREDICTION MODEL FOR FOURTH ZONE | | | | | PREDICTION RESULT OF PREDICTION MODEL FOR FIFTH ZONE | | |
|---|---|---|---|---|---|---|---|---|---|---|---|---|
| ANSWERING PROBABILITY | RETURN CALL PROBABILITY FOR THIRD ZONE | RETURN CALL PROBABILITY FOR FOURTH ZONE | RETURN CALL PROBABILITY FOR FIFTH ZONE | NO-RETURN -CALL PROBABILITY | ANSWERING PROBABILITY | RETURN CALL PROBABILITY FOR FOURTH ZONE | RETURN CALL PROBABILITY FOR FIFTH ZONE | NO-RETURN -CALL PROBABILITY | ANSWERING PROBABILITY | RETURN CALL PROBABILITY FOR FIFTH ZONE | NO-RETURN -CALL PROBABILITY |
| 25% | 30% | 15% | 10% | 20% | 15% | 20% | 30% | 35% | 10% | 15% | 75% |
| 20% | 20% | 25% | 15% | 20% | 10% | 30% | 25% | 35% | 30% | 20% | 50% |
| 30% | 20% | 15% | 5% | 30% | 20% | 25% | 10% | 45% | 20% | 25% | 55% |
| ... | ... | ... | ... | ... | ... | ... | ... | ... | ... | ... | ... |

| CALL TIME ZONE | CARD NUMBER | PERSON-IN-CHARGE ID |
|---|---|---|
| FIRST ZONE | 4738402849209380 | u00001 |
| | 1478233802148730 | u00005 |
| | 8347548204824390 | u00004 |
| | ⋮ | ⋮ |
| SECOND ZONE | 2873482740284240 | u00003 |
| | 5732987520398410 | u00012 |
| | 48759827950295000 | u00008 |
| | ⋮ | ⋮ |
| THIRD ZONE | 3879709808908970 | u00023 |
| | 1387737482493420 | u00002 |
| | 8937927452354180 | u00001 |
| | ⋮ | ⋮ |
| FOURTH ZONE | 9384794571998400 | u00021 |
| | 2099080481401890 | u00011 |
| | 8947398087893240 | u00005 |
| | ⋮ | ⋮ |
| FIFTH ZONE | 4598084378927480 | u00012 |
| | 8980274852798310 | u00005 |
| | 6789370787600260 | u00001 |
| | ⋮ | ⋮ |

CALL SUBJECT DETERMINATION SYSTEM, CALL SUBJECT DETERMINATION METHOD, AND INFORMATION STORAGE MEDIUM

CROSS-REFERENCE TO RELATED APPLICATION

The present application claims priority from Japanese application JP 2022-070959 filed on Apr. 22, 2022, the content of which is hereby incorporated by reference into this application.

BACKGROUND OF THE INVENTION

1. Field of the Invention

The present disclosure relates to a call subject determination system, a call subject determination method, and an information storage medium.

2. Description of the Related Art

Hitherto, technologies for assisting in a task that uses a phone call, such as a demand call to a person who is behind in payment of a credit card debt, have been known. For example, in Japanese Patent Application Laid-open No. 2018-081725, there is described a technology with which, when messages including requests for a plurality of debtors who are behind in fulfillment of obligation to make phone calls are to be transmitted, the transmission of the messages is timed based on the number of workers available to field the calls, to thereby prevent the number of calls from exceeding the number of workers.

To give another example, in Japanese Patent Application Laid-open No. 2018-093273, there is described a technology of determining, in order to raise a rate of success of calls to a member, a priority call date/time for preferentially calling the member, based on the member's contact history aggregated for each day of the week and time zone. To give still another example, in Japanese Patent Application Laid-open No. 2018-169738, there is described a technology of generating a delinquent payer list holding a predetermined number of delinquent payers in descending order of the rate of success of calls, based on such attributes as past records of calls to delinquent payers of a tax, a repayment, and the like, rates of success of calls for each period in which calls have been made, and amounts unpaid by the delinquent payers.

SUMMARY OF THE INVENTION

In a task such as those described above, a phone call is made to a call subject in order to gain some advantageous result. When the call subject is, for example, a debtor, a call is made to the call subject in order to gain an advantageous result that is repayment of a borrowed amount. Accordingly, a simple success at having a phone talk with a call subject does not always suffice in a task such as those described above, and it is desired to determine call subjects so that great advantageous results are gained from call subjects on the whole.

However, the technology of Japanese Patent Application Laid-open No. 2018-081725 only prevents reception of calls that exceed the capacity of call takers, and accordingly does not include a process in which an advantageous result to be gained from a received call is taken into consideration. The technologies of Japanese Patent Application Laid-open No. 2018-093273 and Japanese Patent Application Laid-open No. 2018-169738 are aimed to simply make a task plan that raises the rate of success of calls, and accordingly do not include a process in which an advantageous result to be gained from a call made is taken into consideration. Consequently, determination of call subjects that leads to gain of great advantageous results from call subjects on the whole is not accomplished with the related art.

An object of the present disclosure is to increase advantageous results gained from call subjects on the whole.

According to at least one embodiment of the present disclosure, there is provided a call subject determination system including at least one processor configured to: predict, for each of a plurality of call candidates, a talk probability, which is a probability of succeeding in holding a phone talk with the each of the plurality of call candidates; predict, for each of the plurality of call candidates, an advantageous result to be gained from the phone talk with the each of the plurality of call candidates; acquire a talker constraint, which is a constraint in terms of capacity of a talker; and determine, from among the plurality of call candidates, a plurality of call subjects to whom phone calls are to be made so that the talker constraint is satisfied and great advantageous results are gained from the plurality of call subjects on the whole, based on the talk probability and the advantageous result of the each of the plurality of call candidates.

BRIEF DESCRIPTION OF THE DRAWINGS

FIG. 2 is a diagram for illustrating an example of how phone talk is held between a person in charge and a call subject.

FIG. 3 is a pair of graphs for showing an example of a relationship between calls made and calls received at a credit card company.

FIG. 5 is a table for showing an example of a call candidate database.

FIG. 7 is a table for showing an example of probability prediction data.

DETAILED DESCRIPTION OF THE INVENTION

1. Overall Configuration of Call Subject Determination System

A call subject determination system according to at least one embodiment of the present disclosure is described. In the at least one embodiment, a case in which the call subject determination system is used for assistance of a task at a credit card company issuing a credit card is given as an example. The call subject determination system is usable for assistance of a task at any organization. Other usage examples are given in modification examples described later.

Figure 1:
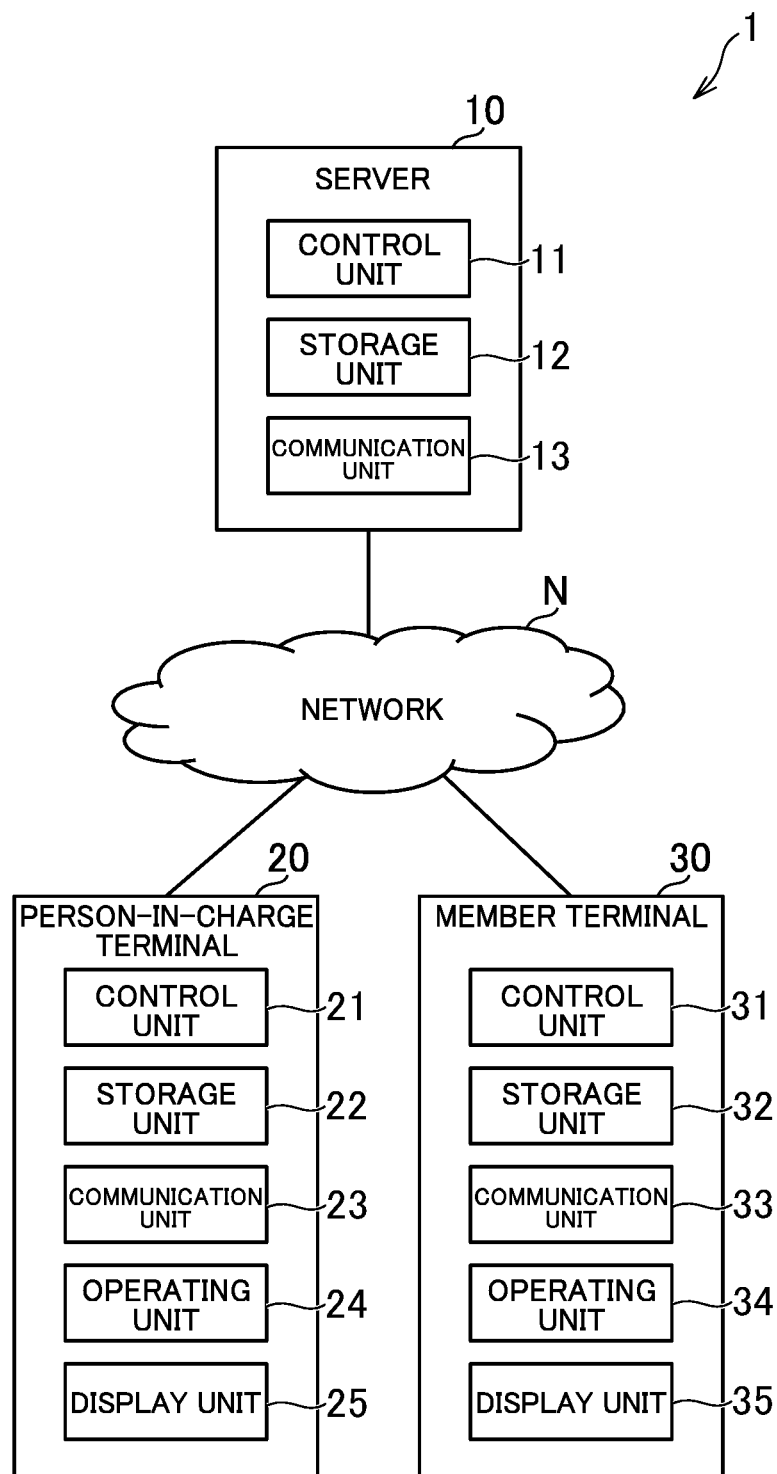
FIG. 1 is a diagram for illustrating an example of an overall configuration of a call subject determination system.

FIG. 1 is a diagram for illustrating an example of an overall configuration of the call subject determination system. A call subject determination system 1 includes, for example, a server 10, a person-in-charge terminal 20, and a member terminal 30. The server 10, the person-in-charge terminal 20, and the member terminal 30 are each connectable to a network N, which is the Internet, a LAN, or the like.

The server 10 is a server computer of the credit card company. A control unit 11 includes at least one processor. A storage unit 12 includes a volatile memory such as a RAM, and a non-volatile memory such as a flash memory. A communication unit 13 includes at least one of a communication interface for wired communication or a communication interface for wireless communication.

The person-in-charge terminal 20 is a computer of a person in charge at the credit card company. The person-in-charge terminal 20 is, for example, a smartphone, a personal computer, or a tablet terminal. A control unit 21, a storage unit 22, and a communication unit 23 may have the same hardware configurations as the hardware configurations of the control unit 11, the storage unit 12, and the communication unit 13, respectively. An operating unit 24 is an input device such as a touch panel. A display unit 25 is a liquid crystal display or an organic EL display.

The member terminal 30 is a computer of a member to whom the credit card is issued. The member terminal 30 is, for example, a smartphone, a personal computer, a tablet terminal, or a wearable terminal. A control unit 31, a storage unit 32, a communication unit 33, an operating unit 34, and a display unit 35 may have the same hardware configurations as the hardware configurations of the control unit 11, the storage unit 12, the communication unit 13, the operating unit 24, and the display unit 25, respectively.

Programs stored in the storage units 12, 22, and 32 may be supplied via the network N. The programs stored on computer-readable information storage media may be supplied via reading units (for example, optical disc drives or memory card slots) for reading the information storage media, or via input/output units (for example, USB ports) for input/output of data to/from an external device.

It is sufficient for the call subject determination system 1 to include at least one computer, and the call subject determination system 1 is not limited to the example of FIG. 1. For instance, the member terminal 30 may be outside the call subject determination system 1. For instance, the call subject determination system 1 may include only one component out of the server 10 and the person-in-charge terminal 20. For instance, the call subject determination system 1 may include three or more computers of the credit card company.

2. Outline of Call Subject Determination System

In the at least one embodiment, a person in charge calls a credit card member in order to check contents of a payment. A member to whom a phone call is to be made is hereinafter referred to as "call subject." A "call" in the at least one embodiment is a phone call about the credit card. The call is made for a specific purpose. The call is also referred to as "outbound call." A call subject is accordingly a person to whom an outbound call is to be made. A call subject is, for example, a member who is behind in payment of a credit card debt. In the at least one embodiment, a case in which the person-in-charge terminal 20 and the member terminal 30 are smartphones, and phone talk is held via phone connection between the person-in-charge terminal 20 and the member terminal 30 is given as an example. However, telephones other than smartphones may be used.

In the at least one embodiment, phone calls using mobile telephone networks are given as an example, but various types of phone calls are usable. The phone calls may be, for example, phone calls using a landline telephone network, phone calls usable on an application of a voice call service, phone calls usable on a messaging application, or phone calls usable on a browser. Definitions of the phone calls accordingly include phone talk on Voice over Internet Protocol (VoIP).

FIG. 2 is a diagram for illustrating an example of how phone talk is held between a person in charge and a call subject. As illustrated in FIG. 2, the person in charge makes a phone call to the call subject. In a case in which the call subject notices the incoming call from the person in charge and answers the call, phone talk is held between the person in charge and the call subject. For example, the person in charge checks with the call subject about payment of a credit card debt.

In a case in which the call subject does not notice the incoming call from the person in charge and does not answer the call, on the other hand, the call subject may return the call to the person in charge. The call subject returns the call immediately after noticing the missed call in some cases, and returns the call after some time has passed since noticing the missed call in other cases. The call subject may not return the call despite noticing the missed call.

In the example of FIG. 2, the call subject directly returns the call to the person in charge, but it is sufficient for the call subject to return the call at one of telephone numbers of the credit card company. For example, the call subject may return the call to a department to which the person in charge belongs, another department, or a call center of the credit card company. The return call to the person in charge may automatically be forwarded to the call center.

In a case in which the person in charge answers the return call from the call subject, for example, the person in charge checks with the call subject about payment of a credit card debt. After demanded by the person in charge, the call subject pays off the delinquent debt. In a case in which the call subject does not return the call, the person in charge may call the call subject again after an interval. When there is an upper limit to the number of calls allowed to be made per day, the person in charge may call within this upper limit.

As described above, a call subject may return a call from the person in charge instead of answering the call. When return calls from call subjects coincide with one another, the person in charge may not be able to answer some of the return calls from call subjects. Even when the return calls are forwarded to the call center, the call center may not be able to answer some of the return calls once a capacity of the call center is exceeded. It is accordingly important to schedule calls by taking a capacity of the credit card company into consideration.

FIG. 3 is a pair of graphs for showing an example of a relationship between calls made and calls received at the credit card company. "Calls received" means received phone calls. "Calls received" is not limited to answered phone calls but includes missed phone calls as well. "Calls received" means the same as incoming calls. "Calls received" is not limited to return calls from call subjects. For example, a call subject may voluntarily call the credit card company. A member who is not behind in payment or a person who is not a member may call the credit card company. When creating a call schedule, it is accordingly required to take calls received other than return calls into consideration.

A person in charge who makes a phone call to a call subject is hereinafter referred to as "caller," and a person who takes a call to the credit card company is hereinafter referred to as "call taker." A caller and a call taker may be the same person or different persons. A caller and a call taker can be anyone who is affiliated with the credit card company in some way, for example, a person in charge who has made a phone call to a call subject, another person in charge from the same department to which the person in charge who has made the phone call belongs, or an operator of the call center.

In the example of FIG. 3, business hours of the credit card company are from 9:00 to 19:00, and are sectioned into 2-hour zones. In the following, a time zone from 9:00 to 11:00 is referred to as "first zone." A time zone from 11:00 to 13:00 is referred to as "second zone." A time zone from 13:00 to 15:00 is referred to as "third zone." A time zone from 15:00 to 17:00 is referred to as "fourth zone." A time zone from 17:00 to 19:00 is referred to as "fifth zone." In the following description, the first zone to the fifth zone are simply referred to as "zones" when discrimination of one zone from another zone is unrequired.

An upper bar graph of FIG. 3 is a graph for showing, for each zone, a relationship between the number of calls made and the number of calls answered. A horizontal axis of the bar graph is a time axis indicating call time zones. The call time zones are time zones in which calls are made. A vertical axis of the bar graph is an axis indicating the number of calls made and the number of calls answered. The number of calls made is the number of calls from callers to call subjects. The number of calls answered is the number of calls from callers that are answered by call subjects.

A lower line graph of FIG. 3 is a graph for showing the number of calls received for each zone. A horizontal axis of the line graph is a time axis indicating call reception time zones. The call reception time zones are time zones in which calls are received. A vertical axis of the line graph is an axis indicating the number of calls received. The number of calls received is the number of calls received at the credit card company. Although an actual number of calls received is not limited to the number of return calls from call subjects, the number of calls received here is only the number of return calls from call subjects in order to simplify the description.

For example, when business of the day starts at the credit card company, callers call a fair number of call subjects in the first zone in order to demand payment. The callers have limited capacities and cannot call all call subjects in the first zone. For example, when there are 5,000 call candidates, not all of the 5,000 call candidates cannot be called in the first zone. Only around 500 to 600 call subjects, for example, can be called in the first zone. The same applies to the second zone to the fifth zone.

For example, a fair number of call subjects answer calls made in the first zone. In a case in which a call subject who has not answered a call made in the first zone immediately returns the call, for example, the return call is made in the first zone. In a case in which a call subject who has not answered a call made in the first zone returns the call after elapse of some time, for example, the return call is made in one of the second zone to the fifth zone. In the second zone to the fifth zone as well, callers make calls and call subjects return the calls.

For example, when many of the call subjects are company workers, return calls may concentrate in time zones around lunch hour. The number of calls received may consequently increase in the second zone to the third zone as in the lower line graph of FIG. 3. As described above, when the number of calls received exceeds the capacity of the credit card company, there is a possibility that return calls from call subjects cannot be answered. This capacity is hereinafter referred to as "call taker constraint."

The call taker constraint is the number of calls that can be answered. The call taker constraint is determined depending on the number of call takers and each call taker's capability to deal with calls. For example, each call taker is capable of taking ten calls per hour. When there are a hundred call takers, the call taker constraint per hour is 1,000 calls. In practice, the call taker constraint varies depending on the call reception time zone. In FIG. 3, however, the call taker constraint is constant in order to simplify the description.

In the example of FIG. 3, the number of calls received exceeds the call taker constraint in the second zone to the third zone. Too many calls made in the first zone may cause a large number of call subjects to return the calls in time zones around lunch hour, resulting in the situation of FIG. 3. In this case, the call takers may not be able to answer the return calls from the call subjects. When the call takers cannot answer the return calls, chances of collecting delinquent payments of the call subjects are lost. From a standpoint of the call subjects, return calls to the credit card company that do not get through mean low convenience.

In addition, a simple success at having a phone talk with a call subject does not always suffice for the credit card company. Advantageous results gained from a phone talk vary from one call subject to another call subject. With some call subjects, no advantageous results are gained from a phone talk with a caller or a call taker. For example, when a call subject is a person who is behind in payment of a credit card debt, the call subject may pay only a part of an unpaid amount or may not pay at all despite a phone talk with a caller or a call taker. It is accordingly considered beneficial to create an efficient schedule for more instances of gaining advantageous results.

In view of this, the call subject determination system 1 according to the at least one embodiment includes a first configuration for scheduling calls so that the call taker constraint of the credit card company is not exceeded, and a second configuration for scheduling calls so that a larger unpaid amount can be collected. Details of the first configuration and the second configuration are described below. The call subject determination system 1 may include only one configuration out of the first configuration and the second configuration as in some of the modification examples described later.

3. Functions Implemented in Call Subject Determination System

Figure 4:
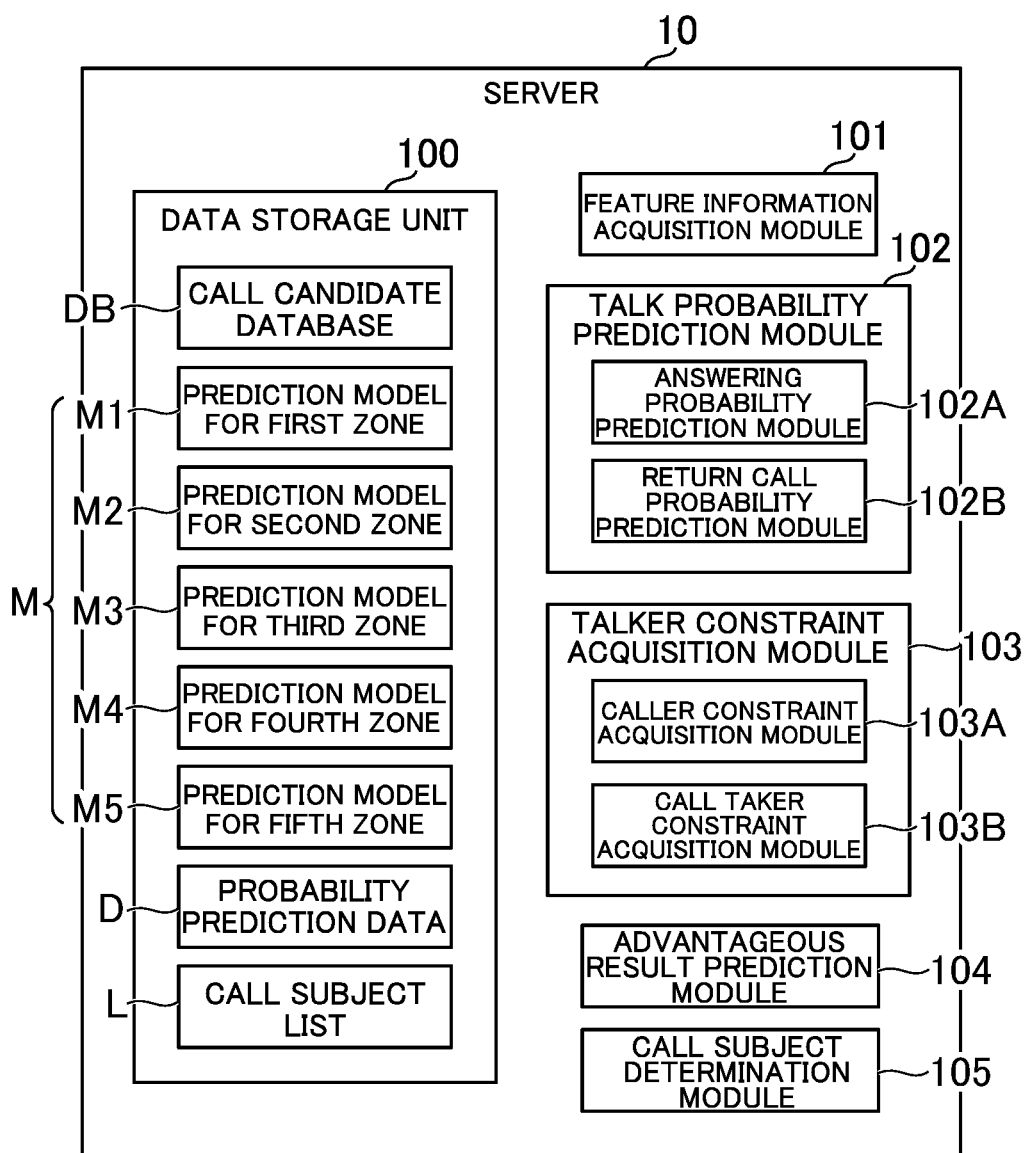
FIG. 4 is a function block diagram for illustrating an example of functions implemented in the call subject determination system.

FIG. 4 is a function block diagram for illustrating an example of functions implemented in the call subject determination system 1. In the at least one embodiment, a case in which main functions are implemented by the server 10 is given as an example. However, it is sufficient for the functions to be implemented by one or more computers included in the call subject determination system 1. For example, the functions may be implemented by the person-in-charge terminal 20. To give another example, implementation of the functions may be divided between the server 10 and the person-in-charge terminal 20. In still another example, the functions may be implemented by a computer that is not the server 10 or the person-in-charge terminal 20.

[3-1. Functions Related to First Configuration]

Functions related to the first configuration are described first. The functions related to the first configuration are, for example, a data storage unit 100, a feature information acquisition module 101, an answering probability prediction module 102A, a return call probability prediction module 102B, a call taker constraint acquisition module 103B, and a call subject determination module 105. The data storage unit 100 is implemented by the storage unit 12. The rest of the functions are implemented by the control unit 11.

In the example of FIG. 4, a case in which a talk probability prediction module 102 includes the answering probability prediction module 102A and the return call probability prediction module 102B is illustrated. However, the first configuration may be free of the concept of the talk probability prediction module 102 including the answering probability prediction module 102A and the return call probability prediction module 102B. Similarly, although a case in which a talker constraint acquisition module 103 includes the call taker constraint acquisition module 103B is illustrated in FIG. 4, the first configuration may be free of the concept of the talker constraint acquisition module 103 including the call taker constraint acquisition module 103B.

[Data Storage Unit]

The data storage unit 100 stores data required for assistance in a task at the credit card company. For example, the data storage unit 100 stores a call candidate database DB, a prediction model M1 for the first zone, a prediction model M2 for the second zone, a prediction model M3 for the third zone, a prediction model M4 for the fourth zone, a prediction model M5 for the fifth zone, probability prediction data D, and a call subject list L. In the following, the prediction models M1 to M5 are simply referred to as "prediction models M" when discrimination of one prediction model from another prediction model is unrequired.

FIG. 5 is a table for showing an example of the call candidate database DB. As shown in FIG. 5, the call candidate database DB is a database storing various types of information about each of a plurality of call candidates. Credit card members are an example of call candidates. Accordingly, in the description about a credit card member, the credit card member can be read as a call candidate.

Call candidates are people who are candidates in determination of call subjects. The call subjects are people to whom phone calls are to be made. The call subjects are people who receive phone calls from callers. The call subjects are determined from a plurality of call candidates. When there are few call candidates, all of the candidates may be determined to be call subjects. In the at least one embodiment, some of a plurality of call candidates are determined to be call subjects. Each of the plurality of call candidates is a credit card member here, but may be anyone who can be a call subject. For example, when the call subject determination system 1 is to be used for a task other than the task of demanding payment (such as a task of making sales calls), call candidates may be members other than members who are behind in payment, or people who are not members of the credit card.

In the at least one embodiment, a case in which people who satisfy a predetermined call candidate condition are selected as call candidates from a parent population is described. Call candidates, however, may be selected from a parent population at random, or may be specified by a person in charge. The call candidate condition is a condition for selecting call candidates. In the at least one embodiment, the parent population is the entirety of the members of the credit card, and the call candidate condition is being behind in payment of a credit card debt. When a member falls behind in payment, the member is selected as a call candidate. The parent population may be any group and the call candidate condition may be any condition. For example, the parent population may be a group of people who are not members of the credit card, and the call candidate condition may be being in a specific age group.

The call candidate database DB stores, for example, a call candidate's card number, name, phone number, occupation, payment information, call subject information, and dealings history information. Information stored in the call candidate database DB may be any information about a call candidate, and is not limited to the example of FIG. 5. For instance, information required for identity confirmation of a call candidate may be stored in the call candidate database DB.

The card number, the name, the phone number, and the occupation of a call candidate are acquired from, for example, another database storing basic information about members of the credit card. When a member is selected as a call subject, a caller calls a phone number stored in the call candidate database DB as a phone number of a call candidate who is the call subject. The payment information is information about delinquent payment of the member. The payment information indicates, for example, an unpaid amount. The payment information may include other types of information, such as a name of a recipient of a delinquent payment and a due payment date.

The call subject information is information indicating whether the call candidate is selected as a call subject. In the at least one embodiment, call subjects are selected for each zone, and the call subject information accordingly indicates a zone for which the call candidate is selected as a call subject as well. In the example of FIG. 5, a value indicating whether the call candidate is selected as a call subject is shown for each zone. The call subject list L described later is created based on the call subject information. The dealings history information is information about contents of a phone talk with the call subject. For example, the dealings history information indicates a date/time at which a phone talk with the call subject has been had, and contents of the talk. In the example of FIG. 5, it is assumed that calls are not made yet, and nothing is accordingly stored in the dealings history information.

Figure 6:
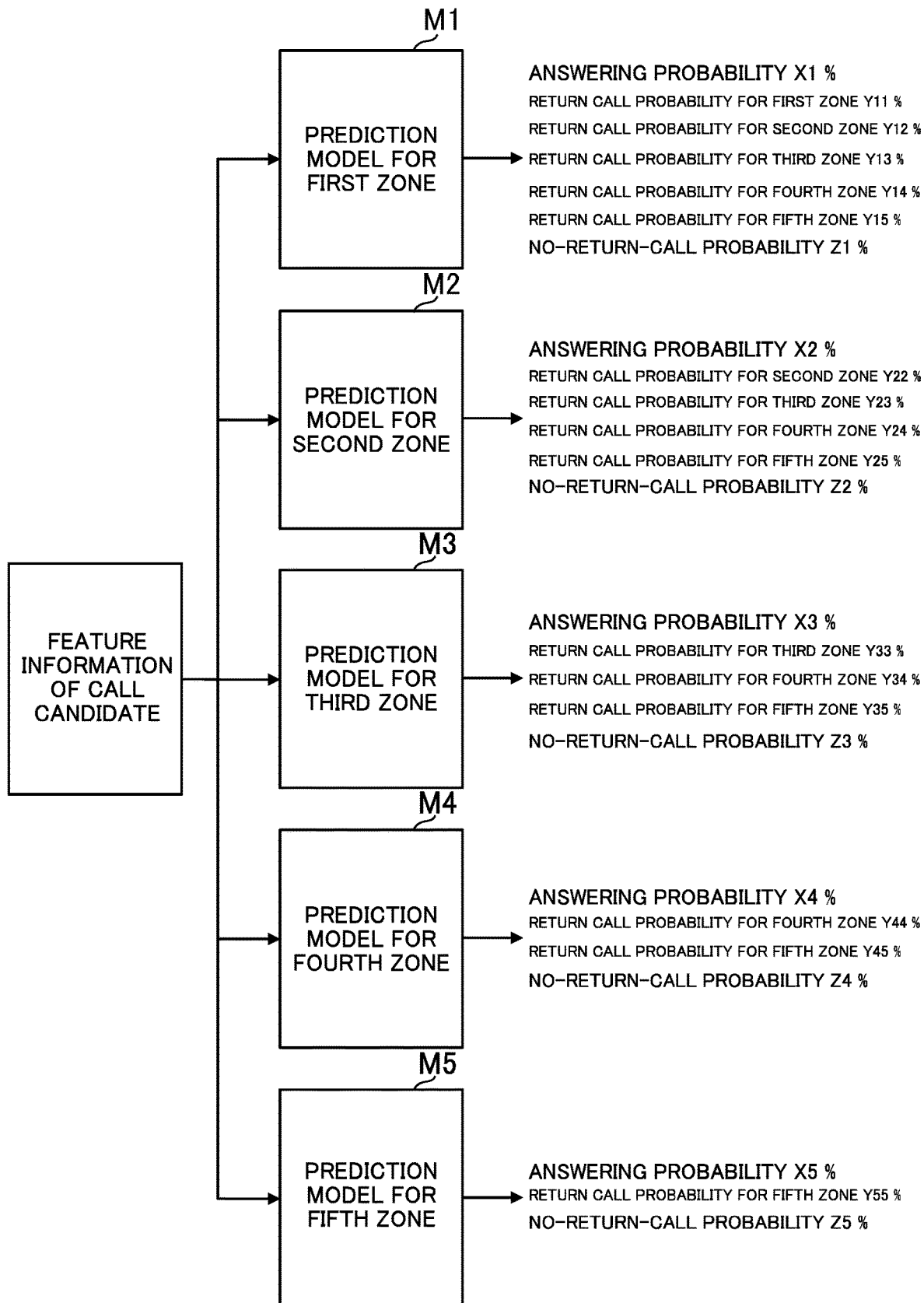
FIG. 6 is a diagram for illustrating an example of prediction models.

FIG. 6 is a diagram for illustrating an example of the prediction models M. The prediction models M are models for predicting various probabilities described later. In the at least one embodiment, the prediction models M are prepared for the respective zones on a one-to-one basis. However, it is not always required to prepare the prediction models M for the respective zones on a one-to-one basis, and one prediction model may be used for all zones.

In the at least one embodiment, a case in which the prediction models M are models utilizing machine learning is given as an example. Various methods of machine learning are useable. For example, any method out of supervised learning, semi-supervised learning, and unsupervised learning is usable. For example, a neural network, a support vector machine, or a Bayesian network may be used as the prediction models M.

For example, when feature information described later is input, the prediction models M output an answering probability as well as a return call probability and a no-return-call probability in each zone. The answering probability is a probability at which a phone call from a caller is answered. The return call probability is a probability at which a phone call from a caller is not answered but is returned. The no-return-call probability is a probability at which a phone call from a caller is not answered nor returned. Details of processing using the prediction models M are described later.

The prediction models M may be models utilizing a method other than machine learning. For example, the prediction models M may be models utilizing a rule-based method. In this case, the prediction models M include a plurality of rules. For example, the prediction models M include a first rule for predicting the answering probability and a second rule for predicting the return call probability and the no-return-call probability in each zone. The first rule and the second rule include conditional branching for which determination can be made based on the feature information described later. The conditional branching of the first rule is associated with the answering probability. The conditional branching of the second rule is associated with the return call probability and the no-return-call probability in each zone.

To give another example, the prediction models M may be calculation formulae that are not machine learning or a rule-based method. The prediction models M in this case are calculation formulae that express relationships of the answering probability and the return call probability in each zone to the feature information described later. When feature information that cannot be expressed in numerical values is used, a conversion rule for converting the feature information into a numerical value is set in advance. For example, the prediction models M are data having a table format. Various other models are usable as the prediction models M.

FIG. 7 is a table for showing an example of the probability prediction data D. The probability prediction data D indicates, for example, results of predictions by the answering probability prediction module 102A and the return call probability prediction module 102B, which are described later. Details of the probability prediction data D are described later.

Figure 8:
FIG. 8 is a table for showing an example of a call subject list.

FIG. 8 is a table for showing an example of the call subject list L. For example, a plurality of call subjects determined by the call subject determination module 105, which is described later, are shown on the call subject list L. Details of the call subject list L are described later.

[Feature Information Acquisition Module]

The feature information acquisition module 101 acquires feature information about features of each of a plurality of call candidates. Features can also be referred to as attributes of a call candidate. Although a call candidate has various features, a feature acquired as the feature information is a feature having a correlation with at least one probability out of the answering probability and the return call probability, which are described later. In the at least one embodiment, description is given by taking occupation as an example of the feature of each call candidate. However, the feature of each candidate can be any feature, for example, age, address, hobby, gender, place of work, annual income, unpaid amount, past utilization situation of the credit card, past delinquency history, or past repayment history, or a combination thereof.

In the at least one embodiment, occupation of each call candidate is stored in the call candidate database DB, and the feature information acquisition module 101 accordingly acquires occupation of each call candidate that is stored in the call candidate database DB as the feature information. The feature information may be stored in a database other than the call candidate database DB. In this case, the feature information acquisition module 101 acquires the feature information from the other database. In a case in which the feature information is recorded on a computer other than the server 10 or an information storage medium, the feature information acquisition module 101 acquires the feature information from the other computer or the information storage medium.

When occupation of a call candidate is company worker, the answering probability is high in the second zone to the third zone, which are around lunch hour, and the return call probability is often high as well. In the first zone, a call may be answered in a case of a type of business in which office hours start late, but there is often no time for a return call because work is likely to start soon. Consequently, the answering probability is somewhat high but the return call probability is low in the first zone. In the fourth zone to the fifth zone, the call candidate is working and the answering probability is consequently low, but may return the call at break, with the result that the return call probability is somewhat high.

When occupation of a call candidate is, for example, student, the answering probability is high and the return call probability is somewhat high in the first zone because there is no class in the first zone and the call candidate often has time to spare. From the second zone on, the answering probability and the return call probability are not so high because there are often classes. In lunch hour, many students spend time with friends and pay not much attention on their phones compared to business people, and the answering probability and the return call probability in the second zone to the third zone are consequently not as high as those of business people.

As described above, in the at least one embodiment, occupation having a correlation with the answering probability and the return call probability is used as the feature information. The other features mentioned above (for example, age, address, gender, place of work, annual income, unpaid amount, past utilization situation of the credit card, and past delinquency history) are also considered to have a correlation with the answering probability and the return call probability, and are accordingly usable as the feature information. Any other feature that has in general a correlation with the answering probability and the return call probability is usable as the feature information. Which feature is to be used as the feature information can be specified as seen fit by a person in charge at the credit card company.

[Answering Probability Prediction Module]

The answering probability prediction module 102A predicts, for each of a plurality of call candidates, the answering probability at which the call candidate answers a phone call. In the at least one embodiment, a case in which the answering probability prediction module 102A predicts the answering probability for each call time zone is given as an example. However, the answering probability prediction module 102A may predict the answering probability without paying special regards to call time zones. In a case in which a day is not divided into zones, the answering probability prediction module 102A may predict an answering probability common to all hours of the day. The same applies to the return call probability.

In the at least one embodiment, the prediction models M are prepared for the respective call time zones on a one-to-one basis, and the answering probability prediction module 102A accordingly predicts the answering probability for each call time zone, based on one of the prediction models M that is used for that call time zone. For example, the prediction models M have learned a relationship between the feature information of a call candidate and whether the call candidate has answered a past phone call. This relationship can be created by aggregating actual performance in past operation. This relationship is learned as training data by the prediction models M.

As illustrated in FIG. 6, when the feature information of a call candidate is input to the prediction model M1 for the first zone, the prediction model M1 outputs an answering probability X1 based on the feature information of this call candidate. For example, the prediction model M1 for the first zone converts the input feature information into a multidimensional vector. The prediction model M1 for the first zone outputs the answering probability X1 based on the multidimensional vector. The answering probability prediction module 102A predicts the answering probability X1 of the first zone by acquiring the answering probability X1 output from the prediction model M1 for the first zone.

Processing of the prediction models M2 to M5 for the second zone to the fifth zone is the same as the processing of the prediction model M1 for the first zone. However, pieces of training data different from the training data of the prediction model M1 for the first zone have been learned by the prediction models M2 to M5 for the second zone to the fifth zone. The training data learned by the prediction model M1 for the first zone is an aggregation of past actual performance in the first zone. The pieces of training data learned by the prediction models M2 to M5 for the second zone to the fifth zone are respective aggregations of past actual performance in the second zone to the fifth zone.

As in FIG. 6, when the feature information of a call candidate is input to the prediction models M2 to M5 for the second zone to the fifth zone, the prediction models M2 to M5 output answering probabilities X2 to X5, respectively, based on the feature information of this call candidate. Although internal parameters of the prediction models M2 to M5 for the second zone to the fifth zone differ from an internal parameter of the prediction model M1 for the first zone, the processing of the prediction models M2 to M5 follows the same flow as the processing flow of the prediction model M1 for the first zone. The answering probability prediction module 102A predicts the answering probabilities X2 to X5 of the second zone to the fifth zone by acquiring the answering probabilities X2 to X5 output from the prediction models M2 to M5 for the second zone to the fifth zone.

For example, the answering probability prediction module 102A predicts the answering probabilities X1 to X5, five answering probabilities in total, for each call candidate, by using five prediction models M. When there are 5,000 call candidates, the answering probability prediction module 102A may predict 25,000 answering probabilities, or may predict answering probabilities only for some of the call candidates. The answering probability prediction module 102A stores the answering probabilities in the probability prediction data D.

[Return Call Probability Prediction Module]

The return call probability prediction module 102B predicts, for each of a plurality of call candidates, the return call probability, which is a probability of the call candidate returning a phone call instead of answering the call. The return call may be made to a phone number from which the call to the call candidate originates, or a phone number different from that number. It is sufficient for the return call to be a phone call to a person affiliated with an originator of the call to the call candidate.

In the at least one embodiment, a case in which the return call probability prediction module 102B predicts, for each of a plurality of call candidates, the return call probability of the call candidate based on the feature information of the call candidate is given as an example. However, the return call probability may be a fixed value regardless of the feature information. That is, the return call probability may be set as one probability common to all call candidates. In this case, the return call probability prediction module 102B predicts the return call probability of each call candidate by acquiring the one return call probability common to all call candidates.

For example, the return call probability prediction module 102B predicts, for each call candidate, the return call probability of the call candidate based on the feature information of the call candidate. In the at least one embodiment, a case in which calculation of the return call probability with use of the prediction models M equals prediction of the return call probability is given as an example. However, acquisition of a predetermined return call probability may qualify as prediction of the return call probability. In this case, a return call probability is determined in advance for each condition about the feature information. The return call probability prediction module 102B acquires, for each call candidate, a return call probability that is associated with a condition satisfied by the feature information of the call candidate, to thereby predict the return call probability of the call candidate.

In the at least one embodiment, the return call probability prediction module 102B predicts the return call probability of each call candidate with the use of the prediction models M utilizing machine learning. For example, the prediction models M have learned a relationship between the feature information of a call candidate and whether the call candidate returned a call in the past. In a case in which the call candidate has returned a call, a zone in which the return call has been made and a zone in which the call that has prompted the return call has been made are also learned. This relationship can be created by aggregating actual performance in past operation. This relationship is learned as training data by the prediction models M.

In the at least one embodiment, the prediction models M are prepared for the respective call time zones in which phone calls are made, on a one-to-one basis, and the return call probability prediction module 102B accordingly predicts the return call probability of each of a plurality of call candidates for each call time zone. The call time zones can be any time zones created in advance by dividing a day. In the at least one embodiment, a day is divided into five zones, which are the first zone to the fifth zone, and each of the zones is accordingly a call time zone. Although a case in which each call time zone is two hours long is given as an example in the at least one embodiment, different call time zones may have different lengths.

In the at least one embodiment, the return call probabilities of the respective call reception time zones in which return calls are received are output from the prediction models M, and the return call probability prediction module 102B accordingly predicts the return call probability of each of a plurality of call candidates for each call reception time zone. The call reception time zones are time zones that are created in advance by dividing a day and that follow the call time zones. Although a case in which each call reception time zone is two hours long is given as an example in the at least one embodiment, different call reception time zones may have different lengths.

As in FIG. 6, when the feature information of a call candidate is input to the prediction model M1 for the first zone, the prediction model M1 outputs return call probabilities Y11 to Y15 and a no-return-call probability Z1 based on the feature information of this call candidate. The no-returncall probability Z1 is a probability at which the call candidate who has not answered a call in the first zone does not return the call. For example, the no-return-call probability Z1 is a value obtained by subtracting a sum value of the answering probability X1 and the return call probabilities Y11 to Y15 from 100%. Accordingly, a sum of the answering probability X1, the return call probabilities Y11 to Y15, and the no-return-call probability Z1 is 100% in the at least one embodiment.

Processing up through output of the answering probability X1 by the prediction model M1 for the first zone is as described in the description of the answering probability prediction module 102A. The prediction model M1 for the first zone outputs the return call probabilities Y11 to Y15 and the no-return-call probability Z1 based on a multi-dimensional vector of the feature information. The return call probability prediction module 102B predicts the return call probabilities Y11 to Y15 and the no-return-call probability Z1 for the first zone by acquiring the return call probabilities Y11 to Y15 and the no-return-call probability Z1 output from the prediction model M1 for the first zone.

Processing of the prediction models M2 to M5 for the second zone to the fifth zone is the same as the processing of the prediction model M1 for the first zone. However, pieces of training data different from the training data of the prediction model M1 for the first zone have been learned by the prediction models M2 to M5 for the second zone to the fifth zone. The training data learned by the prediction model M1 for the first zone is an aggregation of past actual performance in the first zone. The pieces of training data learned by the prediction models M2 to M5 for the second zone to the fifth zone are respective aggregations of past actual performance in the second zone to the fifth zone.

When the feature information of a call candidate is input to the prediction models M2 to M5 for the second zone to the fifth zone, the prediction models M2 to M5 output return call probabilities Y22 to Y25, Y33 to Y35, Y44 and Y45, and Y55, respectively, and no-return-call probabilities Z2 to Z5, respectively, based on the feature information of this call candidate. Although the internal parameters of the prediction models M2 to M5 for the second zone to the fifth zone differ from the internal parameter of the prediction models M1 for the first zone, the processing of the prediction models M2 to M5 follows the same flow as the processing flow of the prediction model M1 for the first zone. The return call probability prediction module 102B predicts the return call probabilities Y22 to Y25, Y33 to Y35, Y44 and Y45, and Y55, and the no-return-call probabilities Z2 to Z5 of the second zone to the fifth zone by acquiring the return call probabilities Y22 to Y25, Y33 to Y35, Y44 and Y45, and Y55, and the no-return-call probabilities Z2 to Z5 output from the prediction models M2 to M5 for the second zone to the fifth zone.

For example, the return call probability prediction module 102B predicts, for each call candidate, the return call probabilities Y11 to Y15, Y22 to Y25, Y33 to Y35, Y44 and Y45, and Y55, fifteen return call probabilities in total, and five no-return-call probabilities Z1 to Z5, with the use of the five prediction models M. When there are 5,000 call candidates, the return call probability prediction module 102B may predict 75,000 return call probabilities and 25,000 no-return-call probabilities, or may predict the return call probabilities and no-return-call probabilities only for some of the call candidates. The return call probability prediction module 102B stores the return call probabilities and the no-return-call probabilities in the probability prediction data D.

[Call Taker Constraint Acquisition Module]

The call taker constraint acquisition module 103B acquires the call taker constraint, which is a constraint in terms of capacity of call takers who take return calls. The call taker constraint is stored in advance in the data storage unit 100. The example of FIG. 3 is a case in which the call taker constraint is constant regardless of the zone. However, the call taker constraint acquisition module 103B may acquire a call taker constraint for each call reception time zone in which return calls are received. In this case, a call taker constraint is determined for each zone. The call taker constraint acquisition module 103B acquires the call taker constraint determined for the zone of interest. The call taker constraint may be specified by a person in charge at the credit card company, or may automatically be calculated from an attendance schedule at the credit card company.

[Call Subject Determination Module]

The call subject determination module 105 determines, from a plurality of call candidates, a plurality of call subjects to whom phone calls are to be made so that the call taker constraint is satisfied, based on the return call probability of each of the plurality of call candidates. The call taker constraint being satisfied means that a predicted value of the number of calls received falls within a range of the call taker constraint. In the at least one embodiment, a case in which the call taker constraint is set only with respect to return calls is described in order to simply the description. In a case in which phone calls other than return calls are also taken into consideration, the call taker constraint being satisfied means that a sum of a predicted value of the number of other calls received and a predicted value of the number of return calls received falls within the range of the call taker constraint.

For example, the call subject determination module 105 selects a call subject at random from a plurality of call candidates. The call subject determination module 105 calculates a predicted value of the number of calls received based on the return call probability of the selected call subject. When the return call probability of this call subject is 60%, for example, it is considered that there is going to be 0.6 return call, and the call subject determination module 105 predicts the number of return calls received from this call subject to be 0.6 call. The call subject determination module 105 calculates a sum value of this predicted value and predicted values that have been calculated from the return call probabilities of previously selected call subjects. The call subject determination module 105 repeats selection of a call subject until the call taker constraint is reached.

In the at least one embodiment, the return call probability is predicted for each call reception time zone, and the call subject determination module 105 accordingly determines, for each call reception time zone, a plurality of call subjects based on the return call probability of each of a plurality of call candidates in the call reception time zone. For example, for each call reception time zone, the call subject determination module 105 repeats selection of a call subject based on the return call probability in the call reception time zone, until the predicted value of the number of calls received reaches the call taker constraint. This differs from the processing described above in that call subjects are selected for each call reception time zone, but is the same in other regards.

In the at least one embodiment, the return call probability is predicted for each call time zone, and the call subject determination module 105 accordingly determines a plurality of call subjects for each call time zone based on the return call probability of each of a plurality of call candidates in the call time zone. For example, for each call time zone, the call subject determination module 105 repeats selection of a call subject based on the return call probability in the call time zone until the predicted value of the number of calls received reaches the call taker constraint. This differs from the processing described above in that the return call probability predicted for each call time zone is used, but is the same in other regards.

In the at least one embodiment, the call subject determination module 105 determines a plurality of call subjects based on the answering probability and the return call probability of each of a plurality of call candidates, because a call from a caller is sometimes answered by a call candidate. For example, the call subject determination module 105 determines a plurality of call subjects by taking into consideration not only the return call probability but also the answering probability. The call subject determination module 105 may determine a call candidate who is relatively low in return call probability but is relatively high in answering probability to be a call subject.

The processing of the call subject determination module 105 described above is described by taking as an example a case in which the probability prediction data D of FIG. 7 is acquired. In the example here, a caller constraint described in description of the second configuration is taken into consideration in addition to the call taker constraint. The caller constraint in each of the first zone to the fifth zone here is, for example, 500 calls. That is, up through 500 calls to call subjects can be made in each zone at the credit card company. The call taker constraint in each of the first zone to the fifth zone here is 1,000 calls. That is, up through 1,000 return calls can be taken in each zone at the credit card company.

In the example given above, the call subject determination module 105 determines, for each zone, call subjects of the zone so that the number of calls made (the number of call subjects) in the zone does not exceed 500 calls and so that the number of calls received (a predicted value of the number of calls received that is calculated from the return call probability) in the zone does not exceed 1,000 calls. A case in which call subjects are determined at random is described here. However, call subjects may be determined by other methods. For example, call subjects may be determined in descending order of the unpaid amount, or in descending order of the answering probability or the return call probability.

Here, a call candidate is not determined to be a call subject twice or more in one day in order to simplify the description. Accordingly, a call candidate who is determined to be a call subject in, for example, the first zone of one day is not determined to be a call subject in the second zone to the fifth zone of that day. On the next and following days, this call candidate may be determined to be a call subject again.

The call subject determination module 105 first determines call subjects for the first zone so that the number of calls made in the first zone does not exceed 800 calls and so that the number of calls received in the first zone does not exceed 1,000 calls. For example, the call subject determination module 105 selects a call candidate at random from the plurality of call candidates included in the probability prediction data D, and determines this call candidate to be a call subject.

When, for example, the first call candidate of FIG. 7 is determined to be a call subject in the first zone, the call subject determination module 105 increases the number of calls made in the first zone by 1 call and the number of calls received in the first zone by 0.3 call because the return call probability of the first call candidate in the first zone is 30%. The return call probabilities of the first call candidate in the second zone to the fifth zone are 25%, 15%, 5%, and 2%, respectively, and the call subject determination module 105 accordingly increases the numbers of calls received in the second zone to the fifth zone by 0.25 call, 0.15 call, 0.05 call, and 0.02 call, respectively.

As described above, when the first call candidate is determined to be a call subject for the first zone, the numbers of calls received in the first zone to the fifth zone are all affected. A sum value of the return call probabilities in the first zone to the fifth zone is 77% and, accordingly, the total number of calls received on the day increases by 0.77 call by determining the first call candidate to be a call subject for the first zone. Being determined to be a call subject for the first zone, the first call candidate is excluded from call subjects for the second and subsequent zones. The caller constraint and the call taker constraint are not reached in any of the zones yet, and the call subject determination module 105 accordingly determines the next call subject for the first zone.

For example, it is assumed that the second call candidate of FIG. 7 is not determined to be a call subject for the first zone, and the third call candidate is determined to be a call subject for the first zone. The return call probability of the third call candidate in the first zone is 15%, and the call subject determination module 105 accordingly increases the number of calls made in the first zone by 1 call and increases the number of calls received in the first zone by 0.15 call. The return call probabilities of the third call candidate in the second zone to the fifth zone are 20%, 15%, 20%, and 10%, respectively, and the call subject determination module 105 accordingly increases the numbers of calls received in the second zone to the fifth zone by 0.2 call, 0.15 call, 0.2 call, and 0.1 call, respectively.

At this point, with the first and third call candidates selected, the number of calls made and the number of calls received are sum values of calls to be made to and returned from the first and third call candidates. For example, the total number of calls made in the first zone is 2 calls, and the total number of calls received in the first zone is 0.45 call. The total numbers of calls received in the second zone to the fifth zone are 0.45 call, 0.3 call, 0.25 call, and 0.12 call, respectively. The third call candidate, being determined to be a call subject for the first zone, is also excluded from call subjects for the second and subsequent zones.

From then on, the call subject determination module 105 repeats the determination of a call subject for the first zone in the same manner. When at least one constraint out of the caller constraint and the call taker constraint in the first zone is no longer satisfied, the call subject determination module 105 ends the determination of call subjects for the first zone. Not many call subjects immediately return a missed call, and, in the first zone, the caller constraint accordingly reaches a point at which the constraint is no longer satisfied faster than the call taker constraint in many cases. However, determination of call subjects for the first zone affects the numbers of calls received in the second zone to the fifth zone as well, and, accordingly, the call taker constraint may reach a point at which the constraint is no longer satisfied faster than the caller constraint in the second zone to the fifth zone.

For example, when the determination of call subjects for the first zone is ended, the call subject determination module 105 determines call subjects for the second zone. Here, the call candidates determined to be call subjects for the first zone are not determined to be call subjects for the second zone to the fifth zone, and the call subject determination module 105 accordingly determines a call subject for the second zone at random from call candidates who have not been determined to be call subjects for the first zone.

For example, it is assumed that the second call candidate of FIG. 7 is determined to be a call subject for the second zone. The return call probability of the second call candidate in the second zone is 20%, and the call subject determination module 105 accordingly increases the number of calls made in the second zone by 1 call and increases the number of calls received in the second zone by 0.2 call. The return call probabilities of the second call candidate in the third zone to the fifth zone are 15%, 15%, and 5%, respectively, and the call subject determination module 105 accordingly increases the numbers of calls received in the third zone to the fifth zone by 0.15 call, 0.15 call, and 0.05 call, respectively.

It is assumed that, at the time when the determination of call subjects for the first zone is ended, the total numbers of calls received in the second zone to the fifth zone are 140.2 calls, 100.6 calls, 74 calls, and 42.5 calls, respectively. With the second call candidate determined to be a call subject for the second zone, the numbers of calls received in the second zone to the fifth zone are now 140.4 calls, 100.75 calls, 74.15 calls, and 42.55 calls, respectively.

From then on, the call subject determination module 105 repeats the determination of a call subject for the second zone in the same manner. When at least one constraint out of the caller constraint and the call taker constraint in the second zone is no longer satisfied, the call subject determination module 105 ends the determination of call subjects for the second zone. In the same manner, call subjects are determined for the third zone to the fifth zone. For each of the third zone to the fifth zone, the call subject determination module 105 ends the determination of call subjects when at least one constraint out of the caller constraint and the call taker constraint in the zone is no longer satisfied.

When finishing determining all call subjects in the manner described above, the call subject determination module 105 updates the call subject information of the call candidate database DB. For example, when a call candidate is determined to be a call subject, the call subject determination module 105 updates the call subject information so that a piece of the call subject information about this call candidate indicates a date on which and a zone for which this call candidate has been determined to be a call subject.

For example, the call subject determination module 105 generates the call subject list L and records the generated list in the data storage unit 100. The call subject determination module 105 generates the call subject list L so that, for each call time zone, card numbers of call candidates determined to be call subjects for the call time zone and person-in-charge IDs of persons in charge who are in charge of calling the call subjects are shown. The person-in-charge IDs are recorded in advance in the data storage unit 100. The persons in charge can be determined by any method, and may be determined based on, for example, a working situation of that day. After recording the call subject list L in the data storage unit 100, the call subject determination module 105 ends the determination of call subjects.

The example of FIG. 3 is a case in which the call taker constraint is constant regardless of the zone. In a case in which a call taker constraint is determined for each call reception time zone, the call subject determination module 105 may determine, for each call reception time zone, a plurality of call subjects so that the call taker constraint in the call reception time zone is satisfied. This is different in that the call taker constraint adapted to the call reception time zone is used, but is the same in other regards. The same call candidate may be determined to be a call subject more than once in a day.

[3-2. Functions Related to Second Configuration]

Functions related to the second configuration are described next. The functions related to the second configuration are, for example, the data storage unit 100, the feature information acquisition module 101, the talk probability prediction module 102, the talker constraint acquisition module 103, an advantageous result prediction module 104, and the call subject determination module 105. The data storage unit 100 is implemented by the storage unit 12. The rest of the functions are implemented by the control unit 11.

In FIG. 4, a case in which the talk probability prediction module 102 includes the answering probability prediction module 102A and the return call probability prediction module 102B is illustrated. However, the second configuration may be free of the concepts of the answering probability prediction module 102A and the return call probability prediction module 102B. Similarly, although a case in which the talker constraint acquisition module 103 includes a caller constraint acquisition module 103A and the call taker constraint acquisition module 103B is illustrated in FIG. 4, the second configuration may be free of the concepts of the caller constraint acquisition module 103A and the call taker constraint acquisition module 103B.

[Data Storage Unit]

The data storage unit 100 may be the same as in the first configuration.

[Feature Information Acquisition Module]

The feature information acquisition module 101 may be the same as in the first configuration.

[Talk Probability Prediction Module]

The talk probability prediction module 102 predicts, for each of a plurality of call candidates, a talk probability, which is a probability of being able to have a phone talk with the call candidate. A phone talk with a call candidate means that a caller or a call taker talks with a call candidate on the phone. The phone talk is sometimes held when a call from the credit card company is answered, and is held when a return call from the call candidate is taken other times. The talk probability may be a probability that assumes that the phone talk is held in both cases, or a probability that assumes that the phone talk is held in only one of the cases. "Talk probability" is a concept that encompasses both of the answering probability and the return call probability, which are described in the description of the first configuration. Accordingly, in the description about the answering probability, the answering probability can be read as the talk probability and, in the description about the return call probability, the return call probability can be read as the talk probability.

For example, the talk probability prediction module 102 predicts, for each of a plurality of call candidates, the answering probability at which the call candidate answers a call as the talk probability. For example, the talk probability prediction module 102 predicts the answering probability of each of a plurality of call candidates for each call time zone in which calls are made. The answering probability is predicted in the manner described in the description of the answering probability prediction module 102A of the first configuration.

For example, the talk probability prediction module 102 predicts, for each of a plurality of call candidates, the return call probability, which is a probability of the call candidate returning a phone call instead of answering the call, as the talk probability. For example, the talk probability prediction module 102 predicts the return call probability of each of a plurality of call candidates for each call reception time zone in which return calls are received. The return call probability is predicted in the manner described in the description of the return call probability prediction module 102B of the first configuration.

For example, the talk probability prediction module 102 predicts the talk probability for each of a plurality of call candidates based on the feature information of the call candidate. The method of predicting the answering probability and the return call probability with use of the feature information is as described in the description of the answering probability prediction module 102A and the return call probability prediction module 102B of the first configuration.

The talk probability may mean only the answering probability or only the return call probability. The talk probability may mean a probability other than the answering probability and the return call probability. For example, when a probability at which a call candidate voluntarily calls instead of returning a call can be predicted, the talk probability may mean a probability of being able to have a phone talk over a voluntary call from a call candidate. This probability may be predicted from the feature information of the call candidate, or a trend of past voluntary calls from the call candidate.

[Talker Constraint Acquisition Module]

The talker constraint acquisition module 103 acquires a talker constraint, which is a constraint in terms of capacity of talkers. "Talker" is a concept including callers and call takers both. Accordingly, in the description about a caller, the caller can be read as the talker, and, in the description about a call taker, the call taker can be read as the talker. Talkers may mean only callers, or may mean only call takers. Call takers include persons who receive voluntary calls from call candidates as well as return calls from call candidates.

Definitions of the talker constraint include not only the call taker constraint described in the description of the first configuration, but also the caller constraint in terms of capacity of callers who make phone calls. In FIG. 4, a case in which the talker constraint acquisition module 103 includes the caller constraint acquisition module 103A is illustrated. The caller constraint is stored in advance in the data storage unit 100. The caller constraint may be constant regardless of the zone, but the talker constraint acquisition module 103 may acquire a caller constraint for each call time zone in which phone calls are made. In this case, a caller constraint is determined for each zone. The talker constraint acquisition module 103 acquires the caller constraint determined for the zone of interest. The caller constraint may be specified by a person in charge at the credit card company, or may automatically be calculated from an attendance schedule at the credit card company.

For example, the talker constraint acquisition module 103 acquires, as the talker constraint, the call taker constraint, which is a constraint in terms of capacity of call takers who receive return calls. For example, the talker constraint acquisition module 103 receives the call taker constraint for each call reception time zone in which return calls are received. The call taker constraint is acquired in the manner described in the description of the call taker constraint acquisition module 103B of the first configuration.

[Advantageous Result Prediction Module]

The advantageous result prediction module 104 predicts, for each of a plurality of call candidates, an advantageous result gained from a phone talk with the call candidate.

"Advantageous result" is an advantageous effect of a phone talk. "Advantageous result" may also be referred to as a purpose of the task that uses a phone call. The advantageous result can vary depending on the task that uses the call subject determination system 1. In the at least one embodiment, the advantageous result is an unpaid amount that can be collected from a call candidate. Accordingly, in the description about an unpaid amount that can be collected from a call candidate, the unpaid amount that can be collected can be read as the advantageous result.

The advantageous result prediction module 104 predicts the advantageous result based on a predetermined prediction method. In a case described in the at least one embodiment, the advantageous result prediction module 104 predicts, as the advantageous result, a numerical value obtained by multiplying an unpaid amount that is indicated by the payment information stored in the call candidate database DB by a predetermined repayment probability. However, the advantageous result prediction module 104 may predict the unpaid amount as the advantageous result without any modification. The repayment probability is a probability at which the call candidate pays off the unpaid amount. The repayment probability may be a value common to all call candidates, or a value that varies depending on the feature information of the call candidate. The advantageous result may be a fixed value regardless of the unpaid amount, or may be a value that varies depending on the feature information.

In the at least one embodiment, the advantageous result prediction module 104 predicts, for each of a plurality of call candidates, the advantageous result of the call candidate based on the feature information of the call candidate. For example, data about a relationship between the feature information and the repayment probability is stored in advance in the data storage unit 100. This data may have any format, for example, a table format or a mathematical expression format. This data may also be, for example, rule-based data or a model utilizing machine learning. Based on this data, the advantageous result prediction module 104 predicts the advantageous result of a call candidate that varies depending on the feature information of the call candidate.

In the at least one embodiment, a phone talk is held in one of two cases, which are when a call candidate answers a call and when a call candidate returns a call. Accordingly, the advantageous result prediction module 104 predicts, for each of a plurality of call candidates, the advantageous result to be gained when the call candidate answers a call and the advantageous result to be gained when the call candidate returns a call instead of answering the call. Those advantageous results may be identical with each other or different from each other. For example, a method of calculating the repayment probability for a case in which a call candidate answers a call and a method of calculating the repayment probability for a case in which a call candidate returns a call may differ from each other. The advantageous result prediction module 104 may set the repayment probability so that the repayment probability of a call candidate who returns a call is higher than the repayment probability of a call candidate who answers a call.

A phone talk is held also when a call candidate makes a voluntary call, and the advantageous result prediction module 104 may accordingly predict the advantageous result to be gained when a call candidate voluntarily calls. The advantageous result in this case may be the same as, or different from, the advantageous result predicted to be gained when the call candidate answers a call and the advantageous result predicted to be gained when the call candidate returns a call. For example, the advantageous result prediction module 104 may set the repayment probability so that a call candidate who makes a voluntary phone call is higher in repayment probability than a call candidate who answers a call and a call candidate who returns a call.

[Call Subject Determination Module]

The call subject determination module 105 determines a plurality of call subjects to whom phone calls are to be made from among a plurality of call candidates so that the talker constraint is satisfied and so that great advantageous results are gained from the plurality of call subjects on the whole based on the talk probability and the advantageous result of each of the plurality of call candidate. Unlike the first configuration, the second configuration determines call subjects in a manner that not only satisfies the talker constraint (mainly the call taker constraint in the case of the first configuration) but also yields great advantageous results on the whole. The call subject determination module 105 is accordingly required to determine optimum call subjects by taking into consideration a plurality of elements including the talker constraint and the advantageous result.

In the at least one embodiment, the call subject determination module 105 uses a solver of a knapsack problem to determine a plurality of call subjects from a plurality of call candidates. The knapsack problem is a problem in a computational complexity theory. For example, values "v" and weights "w" are given to respective "n" ("n" is an integer equal to or larger than 2) types of items "i," and some of the items "i" are put in a knapsack so that a sum of the weights "w" does not exceed a withstand weight W of the knapsack. The knapsack problem is, in this case, a problem of figuring out a combination of items that maximizes a sum V of the values "v" of the items "i" put in the knapsack.

Association relationships between the call subject determination system 1 according to the at least one embodiment and the knapsack problem are as follows. Call candidates correspond to the items "i." Call subjects correspond to some of the items "i" that are put in the knapsack. The talker constraint corresponds to the withstand weight W. The talk probabilities (for example, answering probabilities or return call probabilities) of call candidates correspond to the weights "w" of the items "i." A higher answering probability means fewer return calls, and accordingly equals a lighter weight as the weights "w." A higher return call probability means more return calls, and accordingly equals a heavier weight as the weights "w." However, default weights "w" are set to all call candidates because making one phone call costs a caller energy irrespective of whether the call candidate answers the call.

The advantageous results from phone talks with call candidates correspond to the values "v" of the items "i." In the at least one embodiment, however, the values "v" are affected not just by the advantageous results but by the talk probabilities (for example, answering probabilities and return call probabilities) of call candidates as well. For example, a higher answering probability means a higher rate of success resulting from payment demand, and accordingly equals higher values "v." For example, a higher return call probability means a higher rate of success resulting from payment demand, and accordingly equals higher values "v." The advantageous results gained from call subjects on the whole correspond to the sum V of the values "v" of the items "i" put in the knapsack. The call subject determination module 105 determines a plurality of call subjects based on those association relationships, by using a solver of the knapsack problem.

Various solvers of the knapsack problem are usable. For example, the call subject determination module 105 may use a pseudo-polynomial time algorithm utilizing dynamic programming, or a polynomial time approximation scheme, to determine a plurality of call subjects so that the talker constraint is satisfied and so that great advantageous results are gained from a plurality of call subjects on the whole. For example, the call subject determination module 105 uses a solver of the knapsack problem to determine a combination of call subjects that maximizes the advantageous results of call subjects on the whole within a range in which the talker constraint is satisfied.

In the at least one embodiment, the answering probability is predicted as an example of the talk probability, and the call subject determination module 105 accordingly determines a plurality of call subjects based on the answering probability and the advantageous result of each of a plurality of call candidates. Although both of the answering probabilities and the return call probabilities correspond to the weights "w" of the items "i" in the example of the knapsack problem described above, only the answering probabilities may correspond to the weights "w" of the items "i."

In the at least one embodiment, the answering probability is predicted for each call time zone, and the call subject determination module 105 accordingly determines, for each call time zone, a plurality of call subjects based on the answering probability of each of a plurality of call candidates in that call time zone. For example, the call subject determination module 105 uses a solver of the knapsack problem to determine a plurality of call subjects for each call time zone. This is different in that the answering probabilities in each call time zone correspond to the weights "w" of the items "i," but a solver of the knapsack problem described above is applicable in other regards.

In the at least one embodiment, the return call probability is predicted as an example of the talk probability, and the call subject determination module 105 accordingly determines a plurality of call subjects based on the return call probability of each of a plurality of call candidates so that the call taker constraint is satisfied. Although both of the answering probabilities and the return call probabilities can correspond to the weights "w" of the items "i" in the example of the knapsack problem described above, only the return call probabilities may correspond to the weights "w" of the items "i."

In the at least one embodiment, the return call probability is predicted for each call reception time zone, and the call subject determination module 105 accordingly determines, for each call reception time zone, a plurality of call subjects based on the return call probability of each of a plurality of call candidates in that call reception time zone. For example, the call subject determination module 105 uses a solver of the knapsack problem to determine a plurality of call subjects for each call reception time zone.

In the at least one embodiment, the first configuration and the second configuration are used in combination, and the call subject determination module 105 accordingly determines a plurality of call subjects for each call reception time zone so that the call taker constraint in the call reception time zone is satisfied. That is, the call taker constraint corresponds to the withstand weight W in the example of the knapsack problem described above.

The call subject determination module 105 may determine a plurality of call subjects based on a method other than a solver of the knapsack problem. For example, the call subject determination module 105 may use integer programming, which is a solver of an integer programming problem, to determine a plurality of call subjects because the knapsack problem is one of integer programming problems. To give another example, the call subject determination module 105 may use a method in combinatorial optimization to determine a plurality of call subjects.

The call subject determination module 105 may also determine call subjects in, for example, descending order of the advantageous result within a range in which the talker constraint is satisfied. In this case, the call subject determination module 105 determines one call candidate after another as a call subject in descending order of the advantageous result. The call subject determination module 105 ends the determination of a call subject when the talker constraint is no longer satisfied. The call subject determination module 105 creates the call subject list L by the same processing that is described in the description of the first configuration.

4. Processing Executed in Call Subject Determination System

Figure 9:
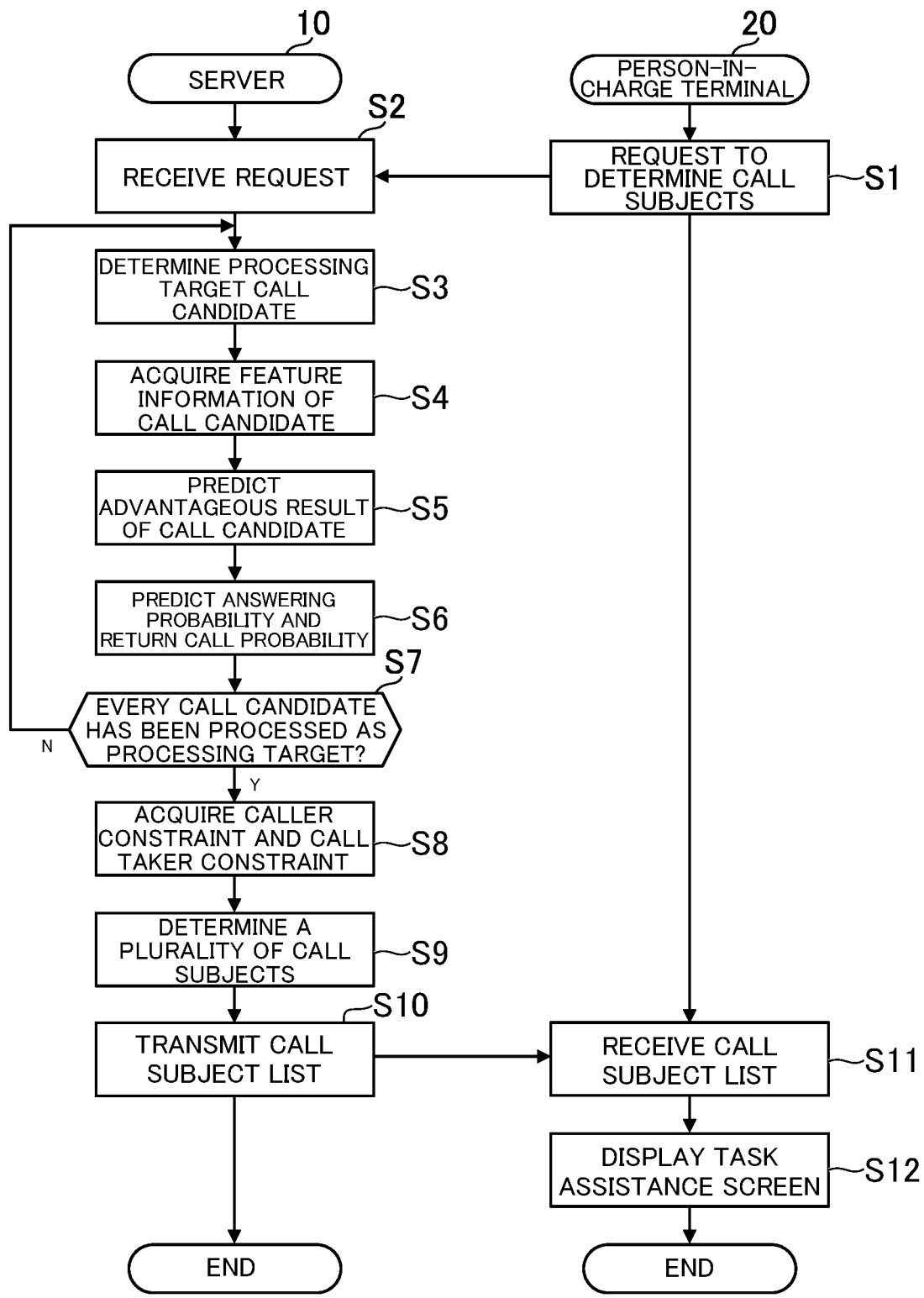
FIG. 9 is a diagram for illustrating an example of processing executed in the call subject determination system.

FIG. 9 is a diagram for illustrating an example of processing executed in the call subject determination system 1. This processing is executed by the control units 11 and 21 by operating in accordance with a program stored in the storage unit 12 and a program stored in the storage unit 22, respectively. In FIG. 9, processing of determining call subjects is mainly illustrated out of the processing executed in the call subject determination system 1. In the at least one embodiment, the processing of FIG. 9 is executed when business of the day starts at the credit card company.

As in FIG. 9, the person-in-charge terminal 20 issues a request to determine call subjects to the server 10 (Step S1). The server 10 receives the request from the person-in-charge terminal 20 (Step S2), and determines a processing target call candidate based on the call candidate database DB (Step S3). The processing target call candidate is a call candidate who is a target of processing steps of from Step S4 to Step S6. In Step S3, the server 10 determines, as the processing target call candidate, any call candidate who has not been a processing target from the call candidate database DB.

The server 10 acquires the feature information of the processing target call candidate based on the call candidate database DB (Step S4). The server 10 predicts the advantageous result of the processing target call candidate based on the unpaid amount of the processing target call candidate and on the repayment probability that is adapted to the feature information (Step S5). The server 10 predicts the answering probability of the processing target call candidate and the return call probability of the processing target call candidate in each call reception time zone, based on the feature information of the processing target call candidate and on the prediction models M for the respective zones from the first zone to the fifth zone (Step S6). The probability prediction data D is created in the processing step of Step S6.

The server 10 determines whether every call candidate has been processed as a processing target (Step S7). When there is a call candidate who has not been a processing target (Step S7: N), the process returns to the processing step of Step S3, and a processing target call candidate is newly determined. When it is determined that every call candidate has been processed as a processing target (Step S7: Y), on the other hand, the server 10 acquires the caller constraint and the call taker constraint, which are determined in advance (Step S8).

The server 10 determines a plurality of call subjects based on the probability prediction data D, the advantageous result predicted in Step S5, and the caller constraint and the call taker constraint acquired in Step S8 (Step S9). In Step S9, the server 10 creates the call subject list L. The server 10 transmits the call subject list L to the person-in-charge terminal 20 (Step S10). The person-in-charge terminal 20 receives the call subject list L (Step S11), and, based on the call subject list L, displays a task assistance screen for assisting in the task at the credit card company on the display unit 25 (Step S12). This processing is then ended.

Figure 10:
FIG. 10 is a diagram for illustrating an example of a task assistance screen.

FIG. 10 is a diagram for illustrating an example of the task assistance screen. As in FIG. 10, a task assistance screen G displays information about call subjects of whom a caller is in charge that day. The caller checks the task assistance screen G and, in each of the first zone to the fifth zone, calls the call subjects of whom the caller is in charge. With the caller making phone calls in a manner displayed on the task assistance screen G, efficient operation that increases advantageous results and satisfies the call taker constraint at the same time is accomplished.

[Summation of First Configuration]

The call subject determination system 1 according to the at least one embodiment determines a plurality of call subjects to whom phone calls are to be made from a plurality of call candidates so that the call taker constraint is satisfied, based on the return call probability of each of the plurality of call candidates. This reduces instances of too many return calls to satisfy the call taker constraint, and consequently increases the chance of a return call from a call subject getting through. With the increase of the chance of a return call getting through, from the standpoint of the credit card company, for example, operation efficiency rises and the chance of collecting delinquent payments increases. From the standpoint of a call candidate, for example, convenience increases as a result of more successful prevention of a situation in which a return call for a missed call from the credit card company does not get through. A call candidate who has taken the trouble of returning a call may become disgruntled with customer service of the credit card company when the return call does not get through. The increased chance of a return call getting through can also improve the customer service of the credit card company.

The call subject determination system 1 also predicts, for each of a plurality of call candidates, the return call probability of the call candidate based on the feature information of the call candidate. When the return call probability varies depending on the occupation of a call candidate, for example, a precision of prediction of the return call probability is raised by predicting a return call probability that is adapted to the occupation of the call candidate. Consequently, the chance of a return call from the call subject getting through increases. The precision of prediction of the return call probability rises also when the feature information used is of a type other than occupation but has a correlation with the return call probability.

The call subject determination system 1 also determines a plurality of call subjects based on the return call probability that is predicted for each call reception time zone and for each of a plurality of call candidates. In a case in which the return call probability of the same call candidate varies depending on the call reception time zone, the precision of prediction of the return call probability is raised by predicting a return call probability that is adapted to the call reception time zone. Consequently, the chance of a return call from a call subject getting through increases.

The call subject determination system 1 also determines a plurality of call subjects for each call reception time zone so that the call taker constraint in the call reception time zone is satisfied. The call taker constraint can thus be set separately for each call reception time zone, and the chance of a return call getting through consequently increases even more. For example, when the call taker constraint is set rather low for a call reception time zone in which call takers are expected to take a break, a situation in which return calls do not get through in this call reception time zone can be prevented. For example, when the call taker constraint is set rather high for a call reception time zone in which a larger number of call takers are expected to work, more return calls can be dealt with in this call reception time zone, and the chance of collecting a delinquent payment accordingly increases.

The call subject determination system 1 also determines a plurality of call subjects for each call time zone based on the return call probability of each of a plurality of call candidates in the call time zone. When the return call probability varies depending on the call time zone, the precision of prediction of the return call probability is raised by predicting a return call probability that is adapted to the call time zone. Consequently, the chance of a return call from a call subject getting through increases.

The call subject determination system 1 also determines a plurality of call subjects based on the answering probability and the return call probability of each of a plurality of call candidates. In this manner, not only call candidates who are likely to return calls but also call candidates who are likely to answer a first call can be selected as call subjects. The credit card company's probability of having phone talks with call candidates consequently increases on the whole.

A call made in the call subject determination system 1 is a demand phone call to a call candidate who are behind in payment. The first configuration of the call subject determination system 1 increases the chance of a return call from a call subject getting through, and accordingly increases the chance of collecting a delinquent payment from a call candidate. This also benefits a call candidate who has missed payment simply by oversight by enabling the call candidate to complete payment and avoid incurring unnecessary interest, and thus increases convenience for the call candidate.

[Summation of Second Configuration]

The call subject determination system 1 according to the at least one embodiment determines a plurality of call subjects from a plurality of call candidates so that the talker constraint is satisfied and so that great advantageous results are gained from a plurality of call subjects on the whole, based on the talk probability and the advantageous result of each of the plurality of call candidates. This enables determination of call subjects that yields greater advantageous results within the talker constraint, and accordingly increases advantageous results gained from a plurality of call subjects on the whole. For example, when call subjects are determined at random regardless of the advantageous results, there is a possibility that a call candidate from whom the advantageous result is unlikely to be gained (for example, a call candidate who does not pay a delinquent debt despite a phone talk) is determined to be a call subject as well. A call candidate from whom the advantageous result is likely to be gained is preferentially determined to be a call subject by taking into consideration the advantageous result to be gained from a phone talk, and advantageous effects gained from call subjects on the whole accordingly increases. From the standpoint of the credit card company, for example, phone calls can be made preferentially to call candidates who are likely to pay delinquent debts, with the result that operation efficiency rises and that the chance of collecting delinquent payments increases. Further, a practical task plan can be created because a situation in which a large number of call subjects that exceed the capacity of the credit card company are determined can be prevented by taking into consideration not only the advantageous result but also the talker constraint.

The call subject determination system 1 also determines a plurality of call subjects based on the answering probability and the advantageous result of each of a plurality of call candidates. A call candidate who is likely to answer a phone call is determined to be a call subject by taking into consideration not only the advantageous result to be gained from the call candidate but also the answering probability of the call candidate, and even greater advantageous results are accordingly gained from call subjects on the whole. When a plurality of call subjects are determined based on the answering probability and the advantageous result of each of a plurality of call candidates, the determination may be made so that only call candidates who are relatively high in answering probability and advantageous result both are determined to be call subjects. In another example, the determination may be made so that call candidates who are, for example, relatively low in answering probability and relatively high in advantageous result are determined to be call subjects. In still another example, the determination may be made so that call candidates who are relatively high in answering probability and relatively low in advantageous result are determined to be call subjects. In a case in which call candidates who are relatively high in answering probability and advantageous result both are preferentially selected to be call subjects, but other call candidates are also selected as call subjects, a well-balanced combination of various types of call candidates can be selected as call subjects.

The call subject determination system 1 also determines a plurality of call subjects for each call time zone based on the answering probability of each of a plurality of call candidates in the call time zone. When the answering probability varies depending on the call time zone, a precision of prediction of the answering probability is raised by predicting an answering probability that is adapted to the call time zone. Consequently, the chance of a phone call being answered by a call subject increases.

The call subject determination system 1 also determines a plurality of call subjects so that the call taker constraint is satisfied based on the return call probability of each of a plurality of call candidates. This reduces instances of too many return calls to satisfy the call taker constraint, and consequently increases the chance of a return call from a call subject getting through. That is, the same effect as the effect of the first configuration is obtained.

The call subject determination system 1 also determines a plurality of call subjects for each call reception time zone based on the return call probability of each of a plurality of call candidates in the call reception time zone. In a case in which the return call probability of the same call candidate varies depending on the call reception time zone, the precision of prediction of the return call probability is raised by predicting a return call probability that is adapted to the call reception time zone. Consequently, the chance of a return call from a call subject getting through increases.

The call subject determination system 1 also determines a plurality of call subjects for each call reception time zone so that the call taker constraint in the call reception time zone is satisfied. The call taker constraint can thus be set separately for each call reception time zone, and the chance of a return call getting through consequently increases even more. For example, when the call taker constraint is set rather low for a call reception time zone in which call takers are expected to take a break, a situation in which return calls do not get through in this call reception time zone can be prevented. For example, when the call taker constraint is set rather high for a call reception time zone in which a larger number of call takers are expected to work, more return calls can be dealt with in this call reception time zone, and the chance of collecting a delinquent payment accordingly increases.

The call subject determination system 1 also predicts, for each of a plurality of call candidates, the talk probability of the call candidate based on the feature information of the call candidate. When the talk probability varies depending on the occupation of a call candidate, for example, a precision of prediction of the talk probability is raised by predicting a talk probability that is adapted to the occupation of the call candidate. Consequently, the chance of a return call from the call subject getting through increases. The precision of prediction of the talk probability rises also when the feature information used is of a type other than occupation but has a correlation with the talk probability.

The call subject determination system 1 also predicts, for each of a plurality of call candidates, the advantageous result of the call candidate based on the feature information of the call candidate. When the advantageous result varies depending on the occupation of a call candidate, for example, a precision of prediction of the advantageous result is raised by predicting an advantageous result that is adapted to the occupation of the call candidate. Consequently, even greater advantageous results are gained from call subjects on the whole. The precision of prediction of the advantageous result rises also when the feature information used is of a type other than occupation but has a correlation with the advantageous result.

A call made in the call subject determination system 1 is a demand phone call to a call candidate who are behind in payment. The second configuration of the call subject determination system 1 increases the advantageous results gained from call subjects on the whole, and accordingly increases the chance of collecting a delinquent payment from a call candidate. This also benefits a call candidate who has missed payment simply by oversight by enabling the call candidate to complete payment and avoid incurring unnecessary interest, and thus increases convenience for the call candidate.

5. Modification Examples

The present disclosure is not limited to the at least one embodiment described above, and can be modified suitably without departing from the spirit of the present disclosure.

Figure 11:
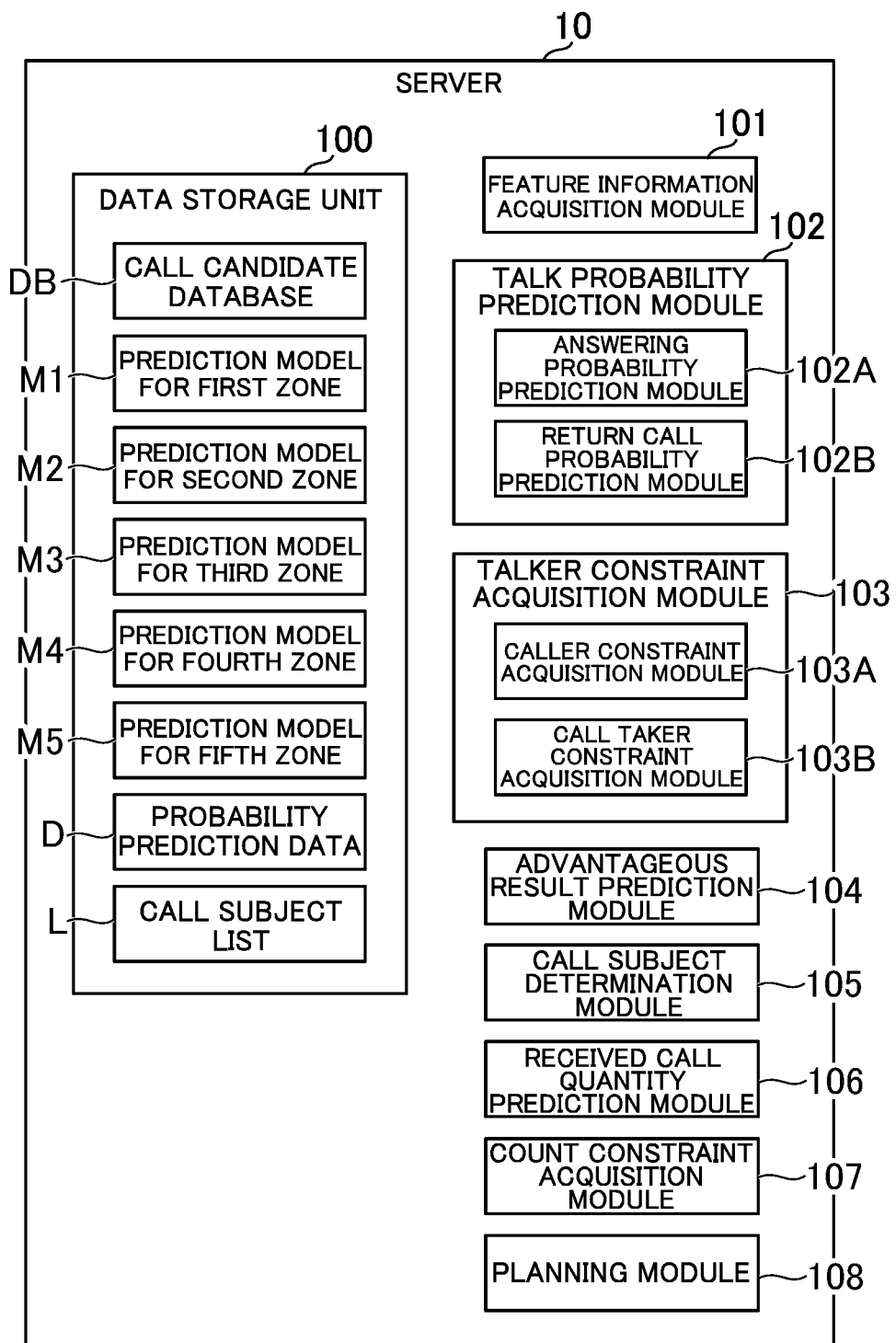
FIG. 11 is a diagram for illustrating an example of function blocks in modification examples.

FIG. 11 is a diagram for illustrating an example of function blocks in modification examples. In the modification examples described below, a received call quantity prediction module 106, a count constraint acquisition module 107, and a planning module 108 are implemented. Those are implemented by the control unit 11.

[5-1. Modification Examples Regarding First Configuration]

Modification examples regarding the first configuration are described first.

Modification Example 1-1

For example, in a case in which a call candidate who is a call subject for the first zone is selected as a call subject for the second zone, which immediately follows the first zone, and has not answered a call in the first zone, the call candidate may not answer a call also in the second zone, which is close to the first zone in terms of time. The call candidate may be offended by the calls received in a row from the credit card company. Accordingly, the first configuration may be modified so as to reduce instances in which a call candidate who is a call subject for one zone is determined to be a call subject for a zone that immediately follows the one zone.

The call subject determination module 105 in Modification Example 1-1 determines a plurality of call subjects for each call time zone so as to reduce instances in which a call candidate who is a call subject in a preceding call time zone is determined to be a call subject in the call time zone of interest. The preceding call time zone is a call time zone that immediately precedes the call time zone for which call subjects are to be determined. For example, in a case of determining call subjects for the second zone, the first zone is the preceding call time zone. "Reduce instances in which a call candidate is determined to be a call subject" means to prevent the call candidate from being determined to be a call subject, or to decrease a probability at which the call candidate is determined to be a call subject.

For example, when a call candidate is determined to be a call subject for the preceding call time zone, the call subject determination module 105 may determine call subjects for the next call time zone after excluding this call candidate from a parent population of call candidates. In this case, this call candidate is not determined to be a call subject for the next call time zone. For example, when a call candidate is determined to be a call subject for the preceding call time zone, the call subject determination module 105 may determine call subjects for the next call time zone after changing the return call probability of this call candidate in the next call time zone to a low probability. In this case, it is less likely that this call candidate is determined to be a call subject for the next call time zone.

The call subject determination module 105 may determine call subjects by other methods. For example, in a case in which the first configuration and the second configuration are used in combination, when a call candidate is determined to be a call subject for the preceding call time zone, the call subject determination module 105 may determine call subjects for the next call time zone after changing the advantageous result of this call candidate in the next call time zone to a low result. In this case, the advantageous result of this call candidate is changed to a result lower than its original advantageous result, and it is less likely that this call candidate is determined to be a call subject for the next call time zone.

The call subject determination system 1 of Modification Example 1-1 determines a plurality of call subjects for each call time zone so as to reduce instances in which a call candidate who is a call subject in the preceding call time zone is determined to be a call subject in the call time zone of interest. This prevents a situation in which, for example, a specific call candidate is determined to be a call subject in succession and calls are made in a row to the specific call candidate. As a result, useless calls are reduced. A call candidate determined to be a call subject in succession may become disgruntled with the customer service of the credit card company due to missed calls received in a row. With instances that cause such dissatisfaction reduced, the customer service of the credit card company can be improved as well.

Modification Example 1-2

For example, the description of the at least one embodiment is simplified by applying the call taker constraint only to return calls. In practice, the credit card company receives phone calls other than return calls as described in the at least one embodiment. Call takers may receive phone calls other than return calls, and call subjects may accordingly be determined so that the call taker constraint is satisfied after taking a received call quantity of the other phone calls into account.

The call subject determination system 1 of Modification Example 1-2 includes the received call quantity prediction module 106. The received call quantity prediction module 106 predicts a received call quantity with respect to phone calls other than return calls. The received call quantity of the other phone calls is the number of other phone calls. The received call quantity prediction module 106 can predict the received call quantity of the other phone calls based on a predetermined prediction method. In Modification Example 1-2, a method of aggregating past phone calls received at the credit card company is given as an example. The received call quantity may be predicted by other methods, and the prediction is not limited to the method in Modification Example 1-2. For example, a predicted value of the received call quantity may be specified by a person in charge, or the received call quantity may be predicted by using a method of machine learning.

For example, incoming call history data, which is a history of past incoming calls at the credit card company, is stored in the data storage unit 100. The history of past incoming calls includes return calls, and return calls are accordingly removed from the incoming call history data. Whether a phone call is a return call can be determined based on actual performance of calls. A call received from a phone number to which a call was made in the past is determined to be a return call.

For example, the received call quantity prediction module 106 aggregates past received call quantities based on the incoming call history data, to thereby predict the received call quantity with respect to the other calls. When a call reception time is divided into zones as in the at least one embodiment, the received call quantity prediction module 106 predicts, for each call reception time zone, the received call quantity with respect to the other calls by aggregating past received call quantities in the call reception time zone. When a call reception time is not particularly divided into zones, the received call quantity prediction module 106 predicts the received call quantity with respect to the other calls by aggregating past received call quantities of all day.

The call subject determination module 105 in Modification Example 1-2 determines a plurality of call subjects so that the call taker constraint is satisfied, based on the return call probability of each of a plurality of call candidates and on the received call quantity of the other calls. For example, the call subject determination module 105 determines a plurality of call subjects so that a post-subtraction call taker constraint obtained by subtracting the received call quantity of the other calls from the call taker constraint is satisfied. The processing of the call subject determination module 105 differs from the processing in the at least one embodiment in that the post-subtraction call taker constraint is used, but is the same in other regards. Instead of subtracting the received call quantity of the other calls from the call taker constraint, the call subject determination module 105 may determine call subjects so that a received call quantity obtained by adding the received call quantity of return calls and the received call quantity of the other calls does not exceed the call taker constraint.

The call subject determination system 1 of Modification Example 1-2 determines a plurality of call subjects so that the call taker constraint is satisfied, based on the return call probability of each of a plurality of call candidates and on the received call quantity of phone calls other than return calls. A plurality of call subjects can thus be determined so that the call taker constraint is satisfied after the other calls are taken into account. Consequently, instances of too many return calls to satisfy the call taker constraint are reduced, and the chance of a return call from a call subject getting through increases. The chance of calls other than return calls getting through increases as well, thus enhancing convenience for people who make the other calls.

Modification Example 1-3

For example, in a case in which an upper limit count is set to the number of calls allowed to be made to a specific call candidate in one day, call subjects may be determined so that the number of calls to each call candidate is contained within the upper limit count. The call subject determination system 1 of Modification Example 1-3 includes the count constraint acquisition module 107. The count constraint acquisition module 107 acquires a count constraint, which is a constraint in terms of the number of calls to each of a plurality of call candidates. The count constraint is an upper limit count of the number of calls allowed to be made in one day. In Modification Example 1-3, a case in which the count constraint is common to all call candidates is described. However, the count constraint may vary from one call candidate to another. The count constraint is specified by a person in charge at the credit card company. Data about the count constraint is stored in advance in the data storage unit 100.

The call subject determination module 105 in Modification Example 1-3 determines a plurality of call subjects so that the count constraint is satisfied. For example, the call subject determination module 105 determines a plurality of call subjects so that the number of times a specific call candidate is determined to be a call subject is within the count constraint. When the number of times a specific call candidate is determined to be a call subject reaches the count constraint, the call subject determination module 105 prevents this call candidate from being determined to be a call subject. The count constraint may be any value, for example, about three times.

The call subject determination system 1 of Modification Example 1-3 determines a plurality of call subjects so that the count constraint is satisfied. This prevents a situation in which many calls are made to a specific call candidate. A call candidate to whom many calls have been made may become disgruntled with the customer service of the credit card company. With the number of calls kept to an appropriate count, the customer service of the credit card company can be improved as well.

Modification Example 1-4

For example, a case in which a return call probability adapted to the call time zone is predicted is described in the at least one embodiment. The return call probability may be affected also by elements other than the call time zone, such as the day of the week, a month, or a season in which the call is made. For example, many call candidates are busy on weekdays and the return call probability is accordingly lower on weekdays than on weekends in many cases. To give another example, the return call probability of a call candidate who works in a type of business that is busy at the end of month or in a specific season is often lower in the busy time than in other times.

The return call probability prediction module 102B in Modification Example 1-4 predicts the return call probability of each of a plurality of call candidates based on a call period in which a phone call is made. The call period is a period in which a call is scheduled to be made, and corresponds to, in addition to the call time zone, the day of the week, the month, or the season described above. In Modification Example 1-4, the prediction models M are prepared for the respective call periods. The return call probability prediction module 102B predicts the return call probability of a call candidate in one call period based on one of the prediction models M that is associated with the call period. To give another example, instead of preparing the prediction models M for the respective call periods, the call period may be used as one of pieces of feature information input to the prediction models M. In this case, the prediction models M output a prediction result adapted to the input call period.

The call subject determination module 105 determines a plurality of call subjects based on the return call probability adapted to the call period of each of a plurality of call candidates. The processing of the call subject determination module 105 differs from the processing in the at least one embodiment in that the return call probability adapted to the call period is used, but is the same in other regards.

The call subject determination system 1 of Modification Example 1-4 determines a plurality of call subjects based on the return call probability that is adapted to the call period of each of a plurality of call candidates. In the case in which the return call probability varies depending on the call period, the precision of prediction of the return call probability is raised by predicting the return call probability that is adapted to the call period. Consequently, the chance of a return call from a call subject getting through increases.

Modification Example 1-5

For example, the call taker constraint may be affected also by elements other than the call reception time zone, such as the day of the week, a month, or a season in which the call is received. For example, a call candidate may return a call on his or her day off. To give another example, inquiries to the credit card company may concentrate on a cut-off date of the credit card or a specific season. Accordingly, a call taker constraint adapted to, in addition to the call reception time zone, other elements, such as the day of the week, a month, or a season, may be acquired.

The call taker constraint acquisition module 103B in Modification Example 1-5 may acquire the call taker constraint based on a call reception period in which a return call is received. The call reception period is a period in which a phone call is expected to be received. The call reception period corresponds to, in addition to the call reception time zone, the day of the week, the month, or the season described above. In Modification Example 1-5, the call taker constraint is prepared for each of those call reception periods. The call taker constraint acquisition module 103B acquires a call taker constraint adapted to the current call reception period.

The call subject determination module 105 determines a plurality of call subjects so that the call taker constraint adapted to the call reception period is satisfied. The processing of the call subject determination module 105 differs from the processing in the at least one embodiment in that the call taker constraint adapted to the call reception period is used, but is the same in other regards.

The call subject determination system 1 of Modification Example 1-5 determines a plurality of call subjects so that the call taker constraint adapted to the call reception period is satisfied. In the case in which the call taker constraint varies depending on the call reception period, a call taker constraint that is adapted to the current call reception period is thus satisfied. Consequently, the chance of a return call from a call subject getting through increases.

Modification Example 1-6

For example, the call subject determination system 1 may include the caller constraint acquisition module 103A in the first configuration as well. The caller constraint acquisition module 103A acquires the caller constraint, which is a constraint in terms of capacity of callers who make phone calls. The caller constraint is as described in the at least one embodiment. The call subject determination module 105 determines a plurality of call subjects so that the call taker constraint and the caller constraint are satisfied. The caller constraint being satisfied means that the number of call subjects is within the caller constraint. The call subject determination module 105 determines a plurality of call subjects so that the number of call subjects determined by the determination method described in the at least one embodiment is within the caller constraint.

The call subject determination system 1 of Modification Example 1-6 determines a plurality of call subjects so that the call taker constraint and the caller constraint are satisfied. This prevents a situation in which a number of call subjects that far exceeds the caller constraint are determined. A practical task plan can be created within the capacity of the credit card company.

Modification Example 1-7

For example, a case in which call subjects are determined so that return calls satisfy the call taker constraint is described in the at least one embodiment. Call subjects may be determined by a method that is not the method described in the at least one embodiment, and it is not particularly required to take the call taker constraint into consideration. Modification Example 1-7 may be free of the concept of the call taker constraint. The call taker constraint acquisition module 103B may accordingly be omitted from the call subject determination system 1. The call subject determination system 1 of Modification Example 1-7 includes the return call probability prediction module 102B, the call subject determination module 105, and the planning module 108. The return call probability prediction module 102B may be the same as in the at least one embodiment.

The call subject determination module 105 in Modification Example 1-7 determines a plurality of call subjects to whom calls are to be made from a plurality of call candidates. For example, the call subject determination module 105 may determine a plurality of call subjects at random from a plurality of call candidates. For example, the call subject determination module 105 may determine a predetermined number of call subjects from a plurality of call candidates in descending order of the unpaid amount. To give another example, the call subject determination module 105 may determine, from a plurality of call candidates, every call candidate whose unpaid amount is equal to or more than a threshold value as a plurality of call subjects.

The planning module 108 creates a plan about call takers who take return calls based on the return call probability of each of a plurality of call subjects. This plan is a plan of the number of call takers. For example, in a case in which return calls are received at a call center, attendance shift of the call center is the plan. The planning module 108 predicts the received call quantity of return calls based on the number of call subjects and on the return call probability of each of the call subjects.

The planning module 108 creates a plan so that call takers can take calls equal to or more than the predicted received call quantity of return calls. The planning module 108 may create a plan for each call reception time zone. That is, the planning module 108 predicts, for each call reception time zone, the received call quantity of return calls in the call reception time zone, and creates a plan so that call takers can take calls equal to or more than the predicted received call quantity of return calls. The planning module 108 may create the plan by taking into account the received call quantity of calls other than return calls as well. For example, the planning module 108 creates a plan so that call takers can take calls equal to or more than a total received call quantity that is a sum of the received call quantity of return calls and the received call quantity of the other calls. Details of the other calls are as described in Modification Example 1-2.

The call subject determination system 1 of Modification Example 1-7 creates a plan about call takers who take return calls based on the return call probability of each of a plurality of call subjects. This increases the chance of return calls getting through. This also enables the credit card company to schedule a break for call takers in a call reception time zone in which the quantity of return calls is predicted to be relatively small, and to assign more call takers to a call reception time zone in which the quantity of return calls is predicted to be relatively large in the attendance shift. Effective task assistance is accordingly accomplished.

[5-2. Modification Examples Regarding Second Configuration]

Modification examples regarding the second configuration are described next.

Modification Example 2-1

For example, the talker constraint acquisition module 103 may acquire the talker constraint for each call time zone in which phone calls are made. As described in the at least one embodiment, the talker constraint is a concept that encompasses the caller constraint and the call taker constraint. The caller constraint and the call taker constraint of each call time zone are as described in the description of the first configuration. When the other constraints described in the at least one embodiment correspond to the talker constraint, the talker constraint of each call time zone is stored in advance in the data storage unit 100.

The call subject determination module 105 in Modification Example 2-1 determines a plurality of call subjects for each call time zone so that the talker constraint in the call time zone is satisfied. Call subjects are determined so that the talker constraint of each call time zone is satisfied by the method described in the description of the first configuration. Modification Example 2-1 differs from the first configuration in that the advantageous result is additionally taken into consideration, but is the same in other regards.

The call subject determination system 1 of Modification Example 2-1 determines a plurality of call subjects for each call time zone so that the talker constraint in the call time zone is satisfied. The talker constraint can thus be set separately for each call time zone, and the capacity of the credit card company can be taken into consideration in a more flexible manner in determining call subjects. This increases the chance of calls to and from the call subjects getting through even more.

Modification Example 2-2

For example, as in Modification Example 1-1, the call subject determination module 105 of the second configuration may also determine a plurality of call subjects for each call time zone in which phone calls are made, so as to reduce instances in which a call candidate who is a call subject for the preceding call time zone is determined to be a call subject for the call time zone of interest. Details of this processing are as described in Modification Example 1-1.

The call subject determination system 1 of Modification Example 2-2 determines a plurality of call subjects for each call time zone in which phone calls are made, so as to reduce instances in which a call candidate who is a call subject for the preceding call time zone is determined to be a call subject for the call time zone of interest. This prevents calls from being made to a specific call subject in a row, as in Modification Example 1-1.

Modification Example 2-3

For example, as in Modification Example 1-3, the count constraint acquisition module 107 of the second configuration may also acquire the count constraint, which is a constraint in terms of the number of calls to each of a plurality of call candidates. Further, the call subject determination module 105 may determine a plurality of call subjects so that the count constraint is satisfied. Details of the former processing and the latter processing are as described in Modification Example 1-3.

The call subject determination system 1 of Modification Example 2-3 determines a plurality of call subjects so that the count constraint is satisfied. This can prevent a situation in which many phone calls are made to a specific call candidate, as in Modification Example 1-3.

Modification Example 2-4

For example, as in Modification Example 1-4, the talk probability prediction module 102 of the second configuration may also predict the talk probability of each of a plurality of call candidates based on a talk period in which a phone talk is held. Further, the call subject determination module 105 may determine a plurality of call subjects based on the talk probability that is adapted to the talk period of each of the plurality of call candidates. Modification Example 2-4 differs from Modification Example 1-4 in that the talk probability includes another probability in addition to the return call probability, but is the same as Modification Example 1-4 in other regards.

The call subject determination system 1 of Modification Example 2-4 determines a plurality of call subjects based on the talk probability that is adapted to the talk period of each of a plurality of call candidates. In a case in which the talk probability varies depending on the talk period, a precision of prediction of the talk probability is raised by predicting the call probability that is adapted to the talk period. This increases the chance of calls to and from the call subjects getting through.

Modification Example 2-5

For example, as in Modification Example 1-5, the talker constraint acquisition module 103 of the second configuration may also acquire the talker constraint based on the talk period in which a phone talk is held. Further, the call subject determination module 105 may determine a plurality of call subjects so that the talker constraint adapted to the talk period is satisfied. Modification Example 2-5 differs from Modification Example 1-5 in that the talker constraint includes another constraint in addition to the call taker constraint, but is the same as Modification Example 1-5 in other regards.

The call subject determination system 1 of Modification Example 2-5 determines a plurality of call subjects so that the talker constraint adapted to the talk period is satisfied. In a case in which the talker constraint varies depending on the talk period, the talker constraint adapted to the current talk period is thus satisfied, and the chance of calls to and from the call subjects getting through is accordingly increased.

5-3. Other Modification Examples

For example, the modification examples described above may be combined with one another.

For example, the call subject determination system 1 may omit the second configuration to include only the first configuration. In this case, it is sufficient for the call subject determination system 1 to determine call subjects so that the call taker constraint is satisfied, without particularly predicting advantageous results to be gained from call candidates. The call subject determination system 1 in this case may determine call subjects so that the call taker constraint for the entire day is satisfied, irrespective of the call time zone and the call reception time zone. The call subject determination system 1 may determine call subjects based only on the return call probability, without particularly predicting the answering probability.

For example, the call subject determination system 1 may omit the first configuration to include only the second configuration. In this case, it is sufficient for the call subject determination system 1 to determine call subjects so that the caller constraint is satisfied and so that great advantageous results are gained from the call subjects on the whole, without particularly taking the call taker constraint into account. Call subjects in this case may also be determined so that the caller constraint for the entire day is satisfied, irrespective of the call time zone and the call reception time zone. The call subject determination system 1 may also determine call subjects based only on the answering probability, without particularly predicting the return call probability.

For example, although the description given above takes as an example a case in which the call subject determination system 1 is used for a task of making a phone call to demand payment at a credit card company, the call subject determination system 1 is applicable to other tasks. For example, the call subject determination system 1 may be used for a task of making sales phone calls at various companies including credit card companies and banks, and may be used for a task of making phone calls for checking contents of a service at a telecommunication company. For example, the call subject determination system 1 may be used for a task of making a phone call at a public office. The call subject determination system 1 may be used for tasks at any other types of business.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A call subject determination system, comprising at least one processor configured to:
   predict, for each of a plurality of call candidates, a talk probability, which is a probability of succeeding in holding a phone talk with the each of the plurality of call candidates;
   predict, for each of the plurality of call candidates, an advantageous result to be gained from the phone talk with the each of the plurality of call candidates;
   acquire a talker constraint, which is a constraint in terms of capacity of a talker; and
   determine, from among the plurality of call candidates, a plurality of call subjects to whom phone calls are to be made so that the talker constraint is satisfied and great advantageous results are gained from the plurality of call subjects on the whole, based on the talk probability and the advantageous result of the each of the plurality of call candidates.

2. The call subject determination system according to claim 1, wherein the at least one processor is configured to:
   predict, for each of the plurality of call candidates, as the talk probability, an answering probability at which the each of the plurality of call candidates answers the phone call;
   predict, for each of the plurality of call candidates, the advantageous result to be gained from the phone call answered by the each of the plurality of call candidates; and
   determine the plurality of call subjects based on the answering probability and the advantageous result of the each of the plurality of call candidates.

3. The call subject determination system according to claim 2, wherein the at least one processor is configured to:
   predict the answering probability of the each of the plurality of call candidates, for each call time zone in which the phone calls are made; and
   determine the plurality of call subjects for each call time zone, based on the answering probability of the each of the plurality of call candidates in the each call time zone.

4. The call subject determination system according to claim 1, wherein the at least one processor is configured to:
   acquire the talker constraint for each call time zone in which the phone calls are made; and
   determine the plurality of call subjects for each call time zone so that the talker constraint in the each call time zone is satisfied.

5. The call subject determination system according to claim 1, wherein the at least one processor is configured to:
   predict, for each of the plurality of call candidates, as the talk probability, a return call probability, which is a probability of the each of the plurality of call candidates returning a phone call instead of answering the phone call;
   acquire, as the talker constraint, a call taker constraint, which is a constraint in terms of capacity of a call taker who takes the returned phone call; and determine the plurality of call subjects so that the call taker constraint is satisfied, based on the return call probability of the each of the plurality of call candidates.

6. The call subject determination system according to claim 5, wherein the at least one processor is configured to:
predict the return call probability of the each of the plurality of call candidates, for each call reception time zone in which the returned phone call is received; and
determine, for each call reception time zone, the plurality of call subjects based on the return call probability of the each of the plurality of call candidates in the each call reception time zone.

7. The call subject determination system according to claim 5, wherein the at least one processor is configured to:
acquire the call taker constraint for each call reception time zone in which the returned phone call is received; and
determine the plurality of call subjects for each call reception time zone so that the call taker constraint in the each call reception time zone is satisfied.

8. The call subject determination system according to claim 1, wherein the at least one processor is configured to:
acquire, for each of the plurality of call candidates, feature information about features of the each of the plurality of call candidates; and
predict, for each of the plurality of call candidates, the talk probability of the each of the plurality of call candidates based on the feature information of the each of the plurality of call candidates.

9. The call subject determination system according to claim 1, wherein the at least one processor is configured to:
acquire, for each of the plurality of call candidates, feature information about features of the each of the plurality of call candidates; and
predict, for each of the plurality of call candidates, the advantageous result to be gained from the each of the plurality of call candidates based on the feature information of the each of the plurality of call candidates.

10. The call subject determination system according to claim 1, wherein the at least one processor is configured to determine, for each call time zone in which the phone calls are made, the plurality of call subjects so as to reduce instances in which one of the plurality of call candidates who is one of the plurality of call subjects in a preceding call time zone is determined to be one of the plurality of call subjects in the each call time zone, the preceding call time zone preceding the each call time zone.

11. The call subject determination system according to claim 1, wherein the at least one processor is configured to:
acquire, for each of the plurality of call candidates, a count constraint, which is a constraint in terms of the number of calls to the each of the plurality of call candidates; and
determine the plurality of call subjects so that the count constraint is satisfied.

12. The call subject determination system according to claim 1, wherein the at least one processor is configured to:
predict the talk probability of the each of the plurality of call candidates based on a talk period in which the phone talk is held; and
determine the plurality of call subjects based on the talk probability of the each of the plurality of call candidates that is adapted to the talk period.

13. The call subject determination system according to claim 1, wherein the at least one processor is configured to:
acquire the talker constraint based on a talk period in which the phone talk is held; and
determine the plurality of call subjects so that the talker constraint adapted to the talk period is satisfied.

14. The call subject determination system according to claim 1,
wherein the plurality of call candidates are each a member of a credit card,
wherein the talker is a person in charge at a credit card company that issues the credit card, and
wherein the phone calls are phone calls about the credit card.

15. A call subject determination method, comprising:
predicting, for each of a plurality of call candidates, a talk probability, which is a probability of succeeding in holding a phone talk with the each of the plurality of call candidates;
predicting, for each of the plurality of call candidates, an advantageous result to be gained from the phone talk with the each of the plurality of call candidates;
acquiring a talker constraint, which is a constraint in terms of capacity of a talker; and
determining, from among the plurality of call candidates, a plurality of call subjects to whom phone calls are to be made so that the talker constraint is satisfied and great advantageous results are gained from the plurality of call subjects on the whole, based on the talk probability and the advantageous result of the each of the plurality of call candidates.

16. A non-transitory information storage medium having stored thereon a program for causing a computer to:
predict, for each of a plurality of call candidates, a talk probability, which is a probability of succeeding in holding a phone talk with the each of the plurality of call candidates;
predict, for each of the plurality of call candidates, an advantageous result to be gained from the phone talk with the each of the plurality of call candidates;
acquire a talker constraint, which is a constraint in terms of capacity of a talker; and
determine, from among the plurality of call candidates, a plurality of call subjects to whom phone calls are to be made so that the talker constraint is satisfied and great advantageous results are gained from the plurality of call subjects on the whole, based on the talk probability and the advantageous result of the each of the plurality of call candidates.

* * * * *